United States Patent [19]

MacKinnon et al.

[11] Patent Number: 4,530,056
[45] Date of Patent: Jul. 16, 1985

[54] AUTOMATED GUIDED VEHICLE SYSTEM

[75] Inventors: Allan S. MacKinnon, Greene; Donald J. Willemsen; David T. Hamilton, both of Ithaca, all of N.Y.

[73] Assignee: Modular Automation Corp., Greene, N.Y.

[21] Appl. No.: 437,403

[22] Filed: Oct. 28, 1982

[51] Int. Cl.³ ............................ G06F 15/50; B62D 1/28
[52] U.S. Cl. .................................. 364/424; 364/449; 318/587; 180/168
[58] Field of Search ............... 364/424, 449, 436, 460; 180/167–169; 318/587, 591

[56] References Cited

U.S. PATENT DOCUMENTS

| Re. 30,492 | 1/1981 | Blakeslee | 180/168 |
|---|---|---|---|
| 2,674,332 | 4/1954 | Ovshinsky | 180/79.1 |
| 3,009,525 | 11/1961 | DeLiban | 180/82 |
| 3,147,817 | 9/1964 | DeLiban | 180/82 |
| 3,245,493 | 4/1966 | Barrett | 180/82 |
| 3,411,603 | 11/1968 | Kohls | 180/98 |
| 3,507,349 | 4/1970 | Comer | 180/98 |
| 3,628,624 | 12/1971 | Wesener | 180/168 |
| 3,715,572 | 2/1973 | Bennett | 235/150.2 |
| 3,768,586 | 10/1973 | Thompson | 180/98 |
| 3,933,099 | 1/1976 | Sieb | 104/88 |
| 4,003,445 | 1/1977 | DeBruine | 318/587 |
| 4,078,630 | 3/1978 | Krieg | 180/98 |
| 4,083,422 | 4/1978 | Blakeslee | 180/98 |
| 4,088,939 | 5/1978 | Mitsckke et al. | 180/168 |
| 4,108,269 | 8/1978 | Nakao | 180/168 |
| 4,168,760 | 9/1979 | Paul | 180/168 |
| 4,247,896 | 1/1981 | Schnaibel | 318/587 |
| 4,253,541 | 3/1981 | Iida | 180/168 |
| 4,284,160 | 8/1981 | DeLiban et al. | 180/168 |
| 4,307,329 | 12/1981 | Taylor | 318/587 |
| 4,310,789 | 1/1982 | Mank et al. | 180/168 |
| 4,344,498 | 8/1982 | Lindfors | 180/168 |

FOREIGN PATENT DOCUMENTS 1904377 10/1973 Fed. Rep. of Germany ...... 180/168

OTHER PUBLICATIONS

Proc. 1st Intl. Conf. on AGVS, Jun. 2–4, 1981, pp. 59–65, Gentil, F., Guided Vehicle Systems at Renault.
Proc. 1st Intl. Conf. on AGVS, Jun. 2–4, 1981, pp. 113–122, Marce, L., Autonomous Computer Controlled Vehicle.
Mater. Handl. Eng., 35, 6, pp. 56–64, (Jun. 1980).
Proc. 1st Intl. Conf. on AGVS, Jun. 2–4, 1981, pp. 67–77, Morris, E. W., Developments in Guided Vehicle Systems.
Proc. 1st Intl. Conf. on AGVS, Jun. 2–4, 1981, pp. 95–101, Sommer, J., Digitrons Automated Guided Vehicle.

Primary Examiner—Gary Chin
Attorney, Agent, or Firm—Martin LuKacher

[57] ABSTRACT

An Automated Guided Vehicle System (AGVS) in which vehicles follow a guidepath defined by wires carrying electrical signals with selected routing between stations along the path. The vehicle has on-board a plurality of sensors operative independently or dependently of the wire for obtaining a plurality of guidance signals. The guidepath has digitally coded patterns which are read by sensors on-board the vehicle and converted into digital signals used by an on-board microcomputer for controlling the guidance modality including the selection of guidance signals from the sensors, and routing for accurate and reliable travel between the selected stations along the guidepath despite interruptions or abnormalities in the guidepath or the need for the vehicles to execute special maneuvers independent of the guidewire.

25 Claims, 17 Drawing Figures

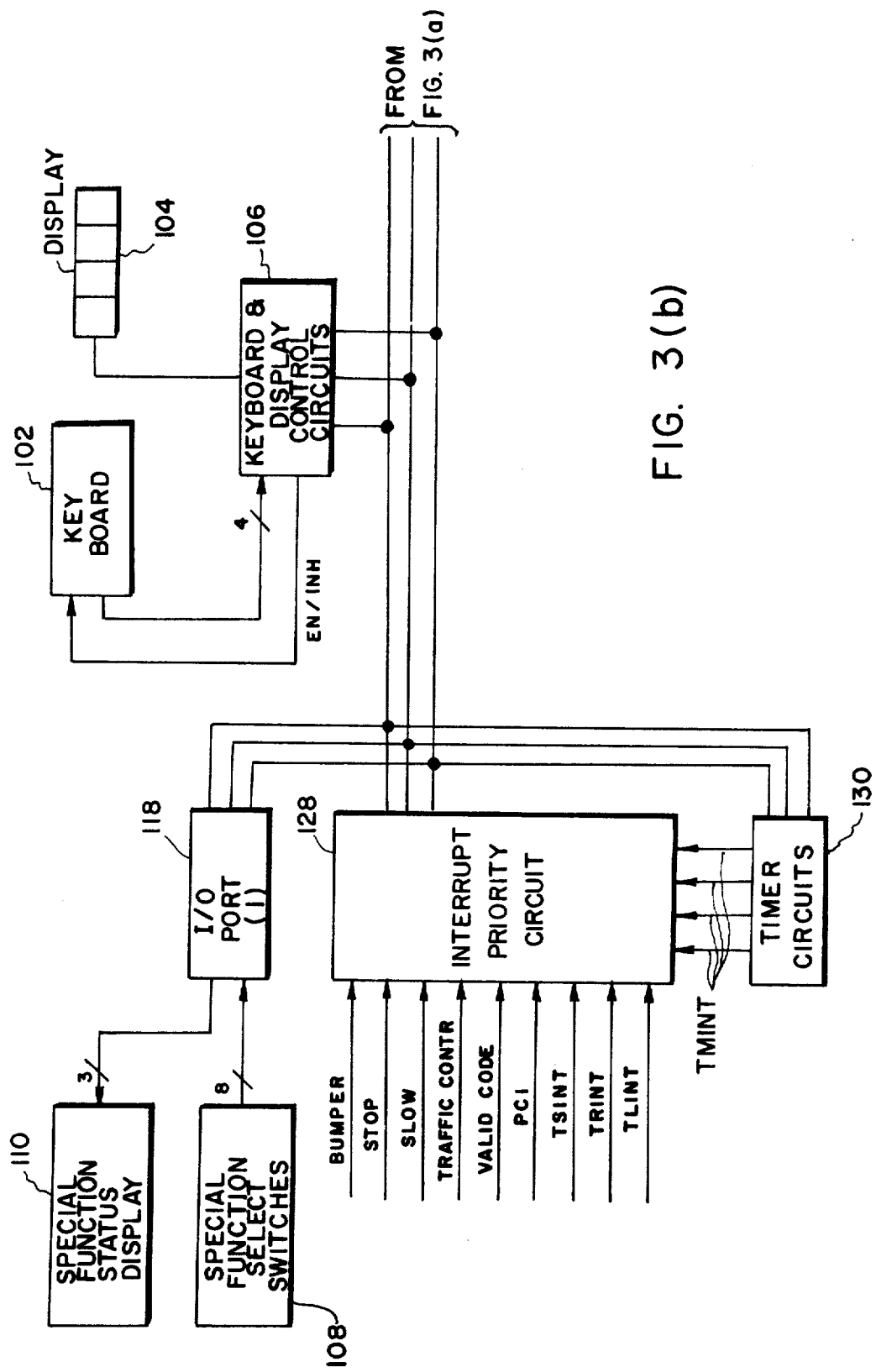

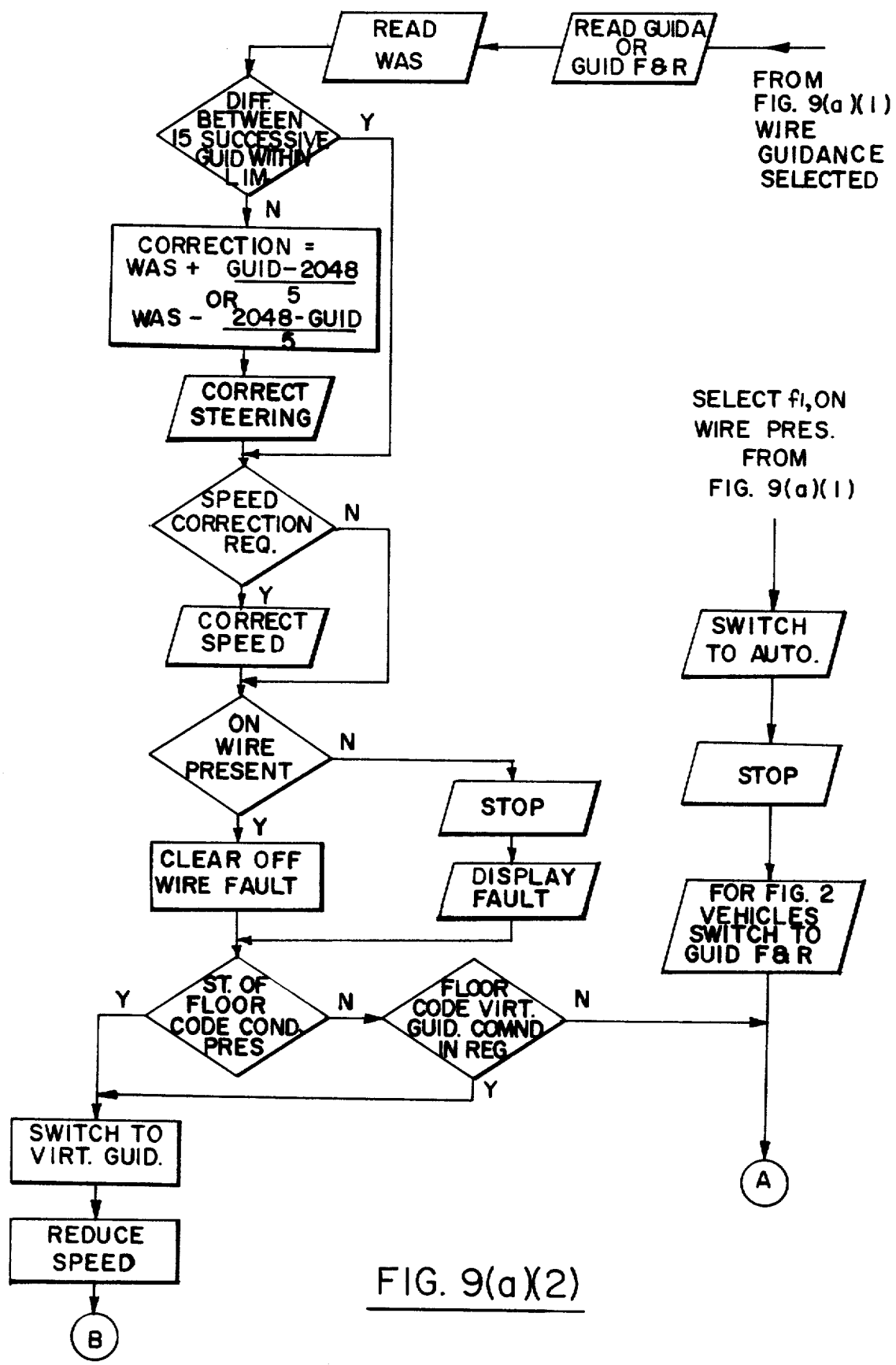
FIG. 9(a)(2)

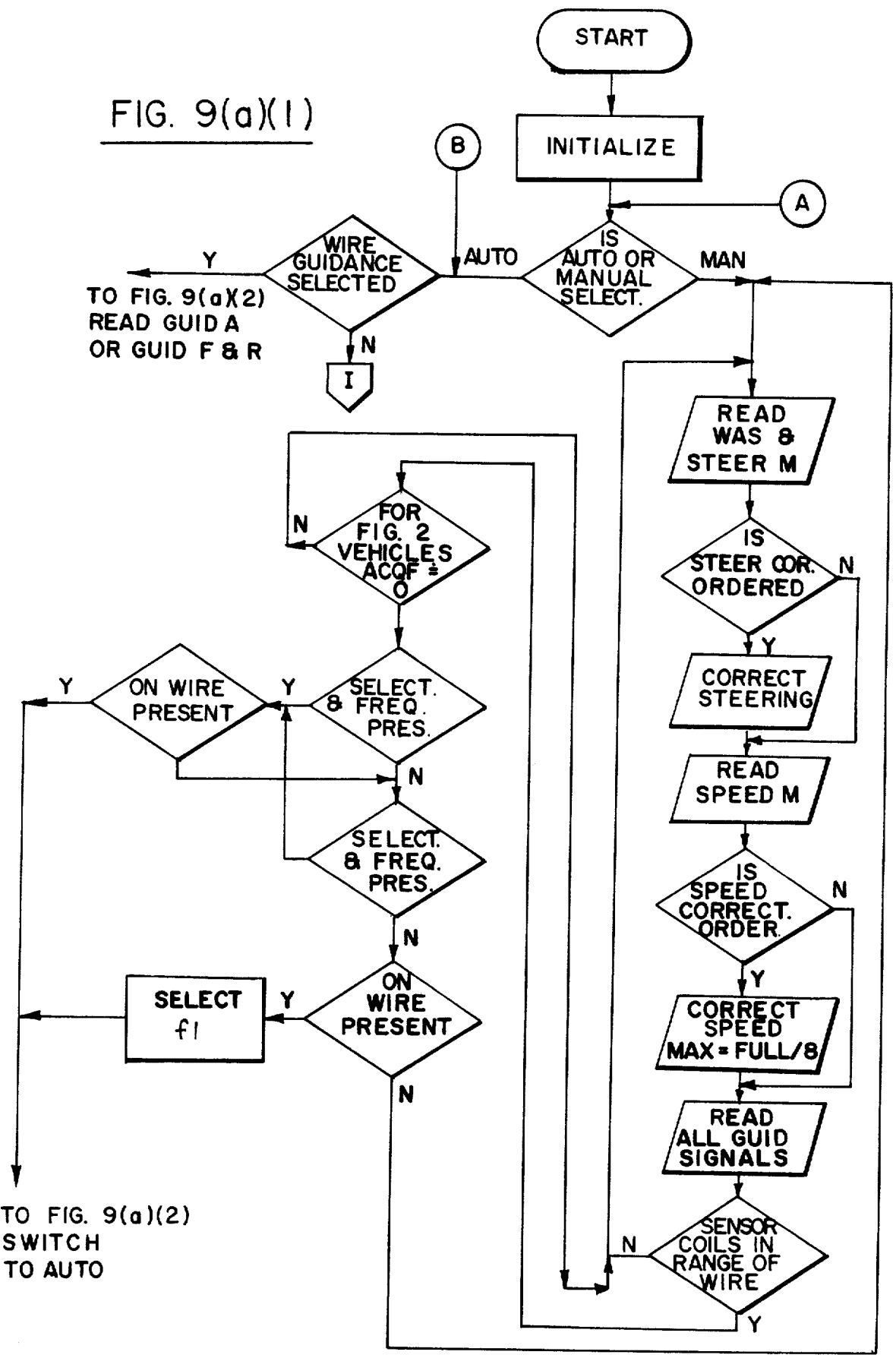
FIG. 9(a)(1)

AUTOMATED GUIDED VEHICLE SYSTEM

DESCRIPTION

The present invention relates to automated guided vehicle systems (AGVS) also known as robot vehicle systems, and particularly to AGVS in which vehicles are automatically guided along a guidepath defined by wires which emit electromagnetic signals.

The present invention is especially suitable for use in an AGVS having a number of battery powered, wheeled, operatorless vehicles which are automatically guided along the floor in a warehouse or other commercial or industrial site, where guidepath wires are embedded in the floor, and under the control of on-board computers. Features of the invention which provide accurate and reliable guidance and routing may also find application in other robotic systems and where a controller may be operated either on-board or remotely from the vehicle.

It is the purpose of an AGVS to move material between various points along a route on vehicles which can be programmed to follow a preset choice of routes and to carry out various operations along the route, such as stops and turns. Most systems which have been proposed use induction guidance where the guidepath is defined by a wire embedded in the floor. An AC current, fed through the wire, generates an electromagnetic field which is detected by coils on the vehicle which track the wire. Two coils are used in most cases which provide a differential current when the vehicle deviates from the wire which is used to control the steering of the vehicle so as to return it to its proper track. The guidepath is usually in the form of a loop. By using two or more different frequencies of the AC current for different legs of the route, complex routes can be built up. Route selection is, in some systems, controlled by a computer on board each vehicle which programs the vehicle to follow a preset route. Typically, permanent magnets or electromagnetic loops and floor controllers installed in the floor divide the route into sections. In a typical installation, the program control computer instructs the vehicle to count its way along the route and to respond to different frequencies so as to follow different legs of the route.

For further information respecting arrangements of coils for obtaining signals used for automatic guidance reference may be had to the following patents: De Liban, U.S. Pat. No. 3,009,525, issued Nov. 21, 1961; Blakeslee, et al., U.S. Pat. No. 4,083,422, issued Apr. 11, 1978; Blakeslee, U.S. Pat. No. Re. 30,492, reissued Jan. 27, 1981; and Taylor, U.S. Pat. No. 4,307,329, issued Dec. 22, 1981. The direction in which a vehicle is steered can be indicated or controlled by the relative speed of a pair of wheels on which the vehicle is supported (See the following U.S. Patents: Bennett, U.S. Pat. No. 3,715,572, issued Feb. 6, 1973; Krieg, U.S. Pat. No. 4,078,630, issued Mar. 14, 1978; and Lindfors, U.S. Pat. No. 4,344,498, issued Aug. 17, 1982.

Reference may be had to the following U.S. Patents for further information respecting the use of magnets, electromagnetic loops and floor controllers for route selection: De Liban, U.S. Pat. No. 3,147,817, issued Sept. 8, 1964; Thompson, et al., U.S. Pat. No. 3,768,586, issued Oct. 30, 1973; Sieb, U.S. Pat. No. 3,933,099, issued Jan. 20, 1976; Kohls, U.S. Pat. No. 3,411,603, issued Nov. 19, 1968; and Paul et al., U.S. Pat. No. 4,168,760 issued Sept. 25, 1979.

It has been suggested also that means be provided for guiding the vehicle independent of the wire for some operations (See the following U.S. Patents: Ovshinsky, U.S. Pat. No. 2,674,332, issued Apr. 6, 1954; Barrett, U.S. Pat. No. 3,245,493, issued Apr. 12, 1966; Comer, et al., U.S. Pat. No. 3,507,349, issued Apr. 21, 1970; Bennett (cited above); and Iida, et al., U.S. Pat. No. 4,253,541, issued Mar. 3, 1981.

The AGVS technology, which has heretofore been available, has enabled a vehicle generally to follow a guidepath, however, guidance with great accuracy as is oftentimes required has not been obtainable. For example, it is desirable to operate within very narrow aisles having as little as two inch clearance for the passage of the vehicle; such narrow aisles being especially desirable in warehouses having closely-spaced storage racks which achieve high material storage density. Another difficulty in existing systems is engendered by unreliable signals from the guidewire. The guidewire in practice can be interrupted or disturbed, as when power lines and steel reinforcements lie adjacent to or cross the guidepath. Reliability also suffers from changes in the guidewire signal due to environmental effects, sensors on the vehicle becoming misaligned in use and also in the aging of the equipment and its components with time. Even a computer of reasonable size to be carried on board the vehicle cannot accommodate all of the effects which might lead to inaccurate or unreliable guidance. It is a feature of this invention to overcome the drawbacks in the area of accurate and reliable guidance which have heretofore existed in AGVS which have obtained guidance from a signal generated by a guidewire and without the need for complex or large computing power; a microprocessor controller being sufficient.

The control of route selection has continued to present problems in AGVS, in spite of the facilities provided by on-board digital computers which can be programmed with route control information. Reliance upon electronic signaling devices, known as floor controllers (see e.g. Paul, et al., cited above) magnets embedded in the floor or special wire loops are unreliable and subject to external signals and other perturbations. Inasmuch as floor controllers are expensive, both initially to install and later to maintain, the use thereof limits the complexity of route selection which can be afforded practically in an AGVS. As a factory or warehouse expands or is modified it becomes necessary to enlarge or modify the route of the guided vehicles. Systems using floor controllers, buried loops and magnets beget problems of reconstruction of the floor together with the removal and installation of new equipment which entails a large expense. Moreover, the computer controllers may require reprogramming. It is a feature of the present invention to overcome these problems of routing through the use of the guidewire itself in a manner which does not interfere with the guidance of the vehicle. Moreover, not only routing, but also control over the mode of guidance of the vehicle, whether dependent or independent of the wire, may be obtained from the wire itself. Operating modes which enable the calibration of the guidance means on the vehicle while it is in motion, selection of sensors for operation in different directions may also be obtained.

Accordingly, it is an object of the present invention to provide an improved robotic apparatus and specifically an improved automated guided vehicle system (AGVS).

It is a further object of the present invention to provide an improved AGVS capable of automatic guidance of vehicles with accuracy and with reliability.

It is a still further object of the present invention to provide an improved AGVS which may have complex routing along a guidepath without complex controllers which are expensive to install, maintain or rearrange upon modification for expansion of the guidepath.

It is a still further object of the present invention to provide an improved AGVS in which guidance mode and routing information is obtained from floor code patterns incorporated in the guidepath embedded in the floor.

It is a still further object of the present invention to provide improved AGVS in which accurate and reliable guidance may be obtained without reliance on guidepath wires so as to improve the reliability of guidance where a guidewire signal is ineffective or perturbed as over metal bridges and adjacent metal bodies, such as reinforcing bars, in the floor.

It is a still further object of the present invention to provide an improved AGVS in which the accuracy and reliability of guidance is maintained automatically by calibration of guidance means carried by the vehicle while the vehicle is on the move.

It is a still further object of the present invention to provide an improved AGVS in which accurate and reliable guidance is obtained by preventing deviations from a guidewire due to interruption of or abnormalities in the signals sensed from the guidewire before inaccurate guidance can occur and enable appropriate action to be taken to maintain vehicle an accurate alignment with the guidepath.

It is a still further object of the present invention to provide an improved AGVS which obtains accurate and reliable guidance in different guidance modes utilizing signals from different ones of a plurality of sensors.

It is a still further object of the present invention to provide an improved AGVS which is substantially application independent and may be used without major modifications in various and different factories, warehouses and other installations.

It is a still further object of the invention to provide an improved AGVS having an on-board computer which can be operated in a learning mode and while so operating, be programmed to execute operations which have been learned, such as turns of various form and other maneuvers.

Briefly described, an AGVS embodying the invention is adapted to be steered along a guidepath defined by a signal carrying wire and has a steering wheel which may be turned to steer the vehicle. A plurality of sensor means are carried by the vehicle. These sensors are responsive to different effects for detecting the direction in which the vehicle is being steered and for providing output signals. The vehicle has means for controlling the steering thereof in response to these output signals so that it may be automatically guided. Means are provided for selecting the output signals from different ones of the sensor means in different portions of the path to obtain accurate and reliable guidance of the vehicles. One of the sensor means may be operative to provide, when inductively coupled to the wire, first control signals which vary in accordance with the deviations of the vehicle from the wire. At a plurality of stations along the path, patterns are provided in the wire by displacements of the wire transversely on the path in opposite directions. These patterns represent a plurality of bits of a digital code. Other sensor means obtain second control signals dependent upon the direction of travel of the vehicle but independent of the wire. Means are provided which are operative upon detection of the pattern for guiding the vehicle with these second control signals while the vehicle travels over the pattern. Means are also provided for reading the pattern for deriving digital signals therefrom. These digital signals may be used to select different modes of operation of the vehicle, including guidance using signals from different sensors, turns and other maneuvers either dependent or independent of the wire, stops and other control events, routing and calibration of the steering means while the vehicle is on the move.

The foregoing and other objects, features and advantages of the invention will become more apparent from a reading of the following description in connection with the accompanying drawings in which.

Figure 2:
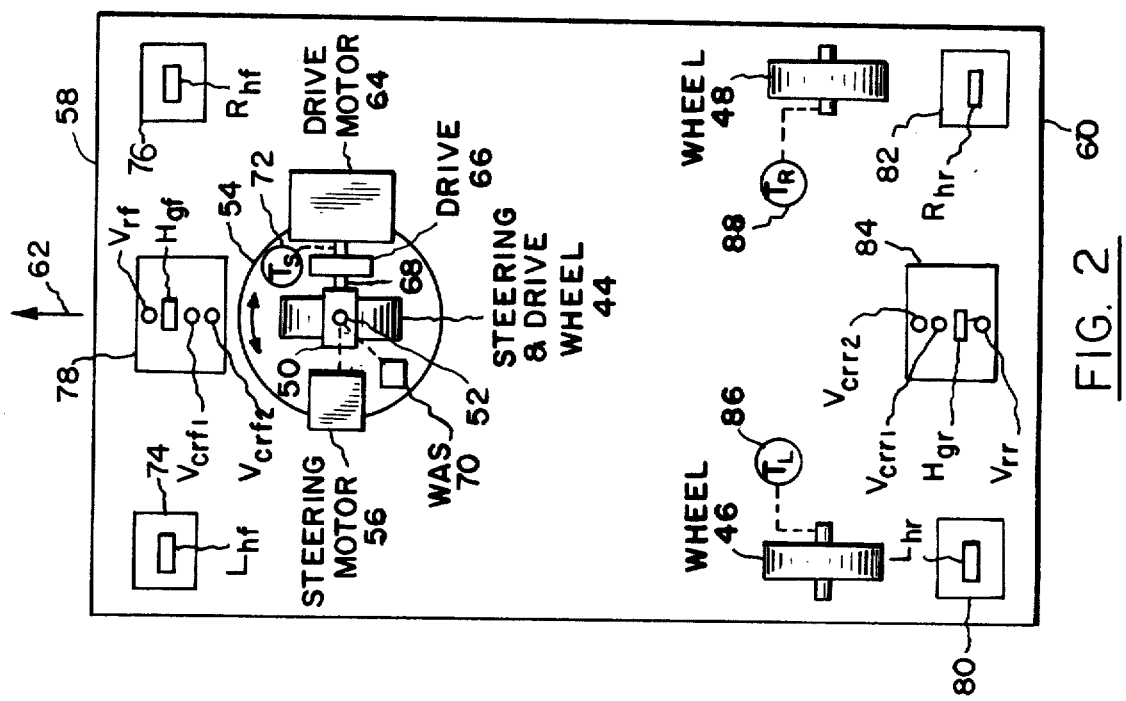
FIG. 2 is a layout schematically showing the guidance and sensor system of another vehicle which may be used in an AGVS embodying the invention.
Figure 1:
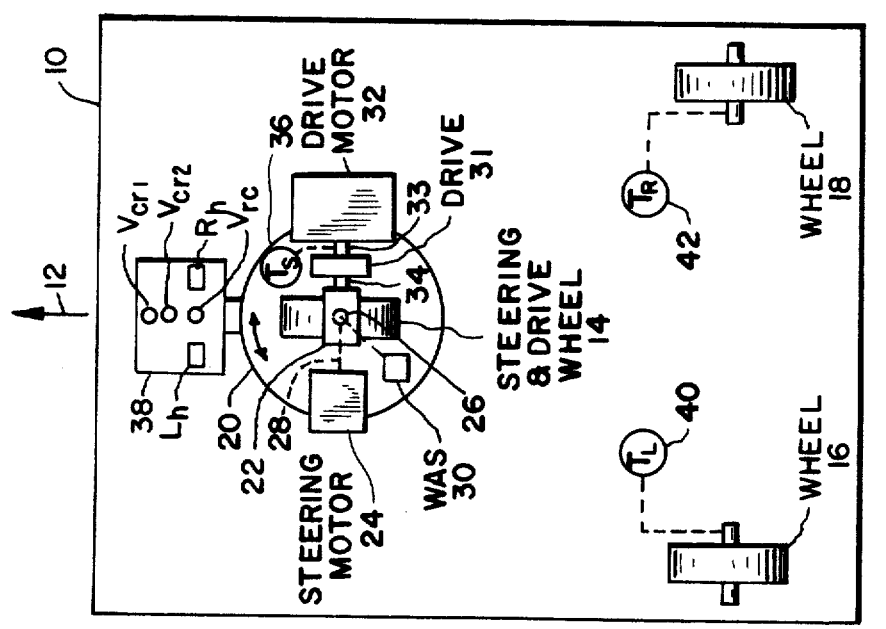
FIG. 1 is the layout showing the guidance and sensor system of a vehicle which may be used in an AGVS embodying the invention.
Figure 3A:
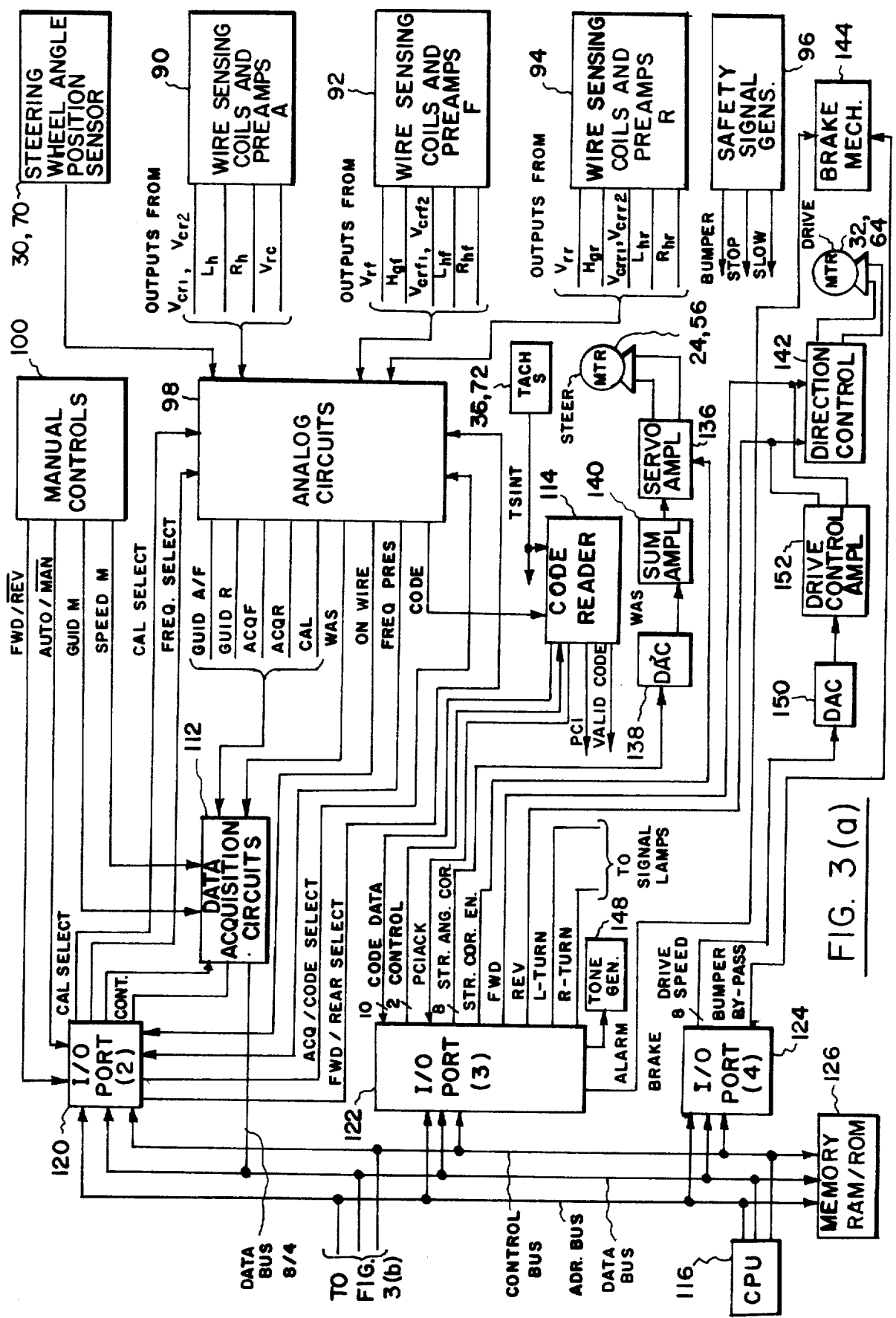
Figure 4:
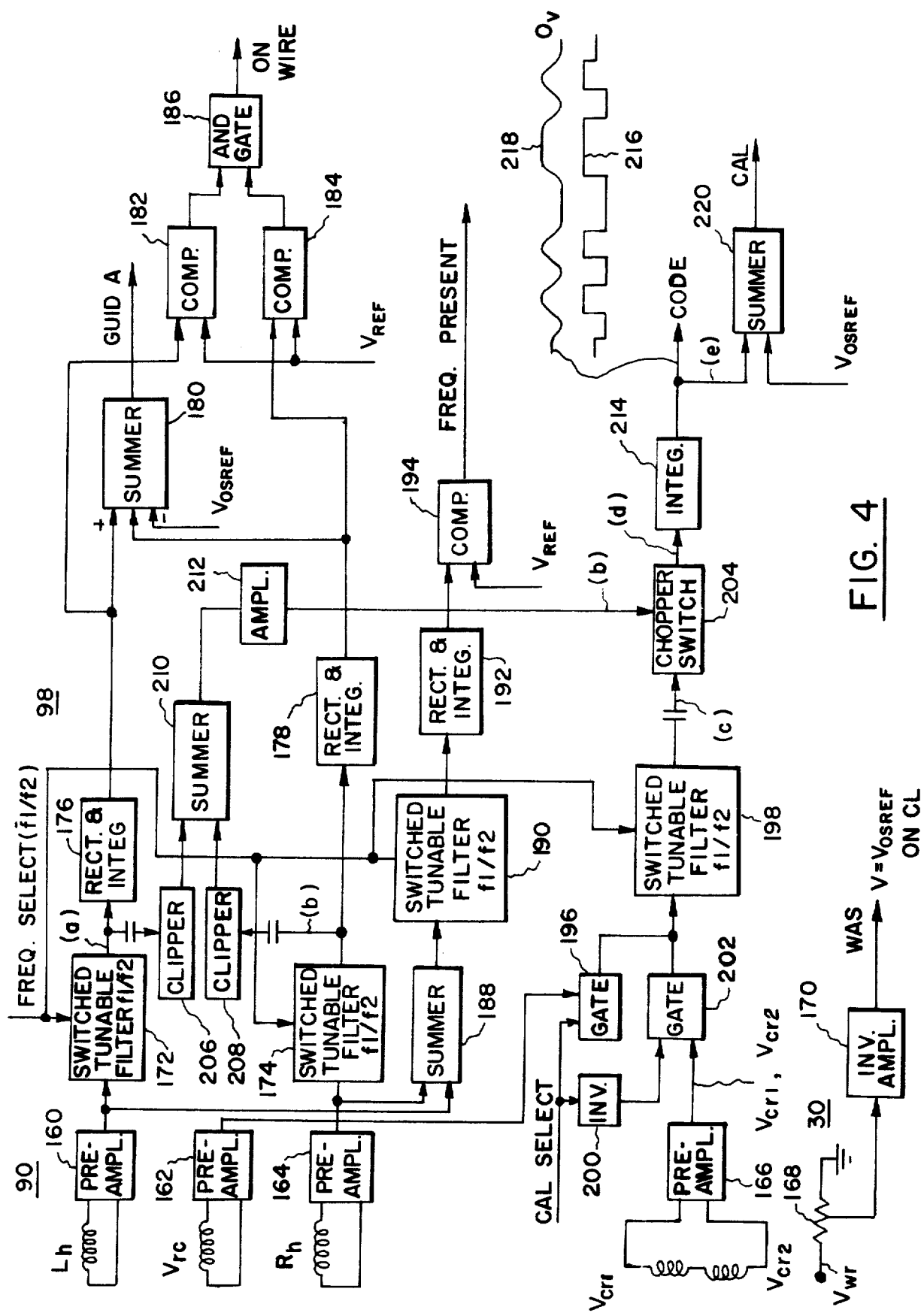
Figure 4A:
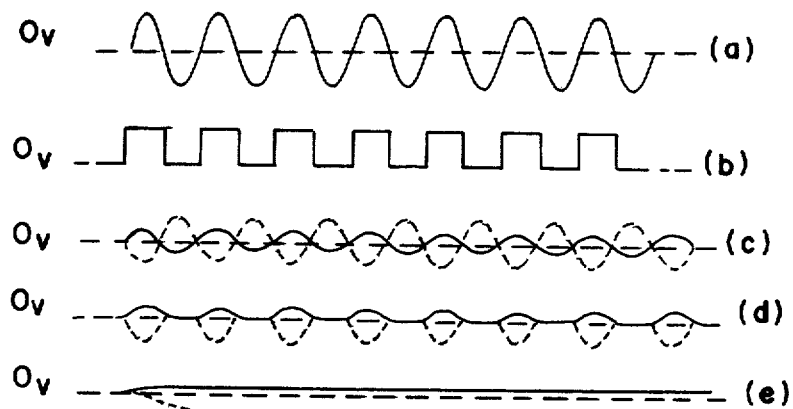
Figure 6:
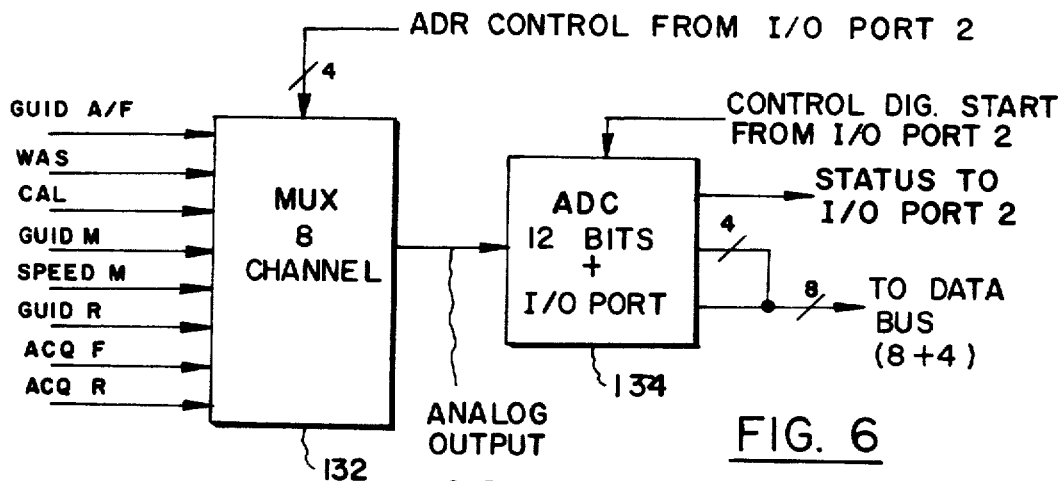
Figure 8:
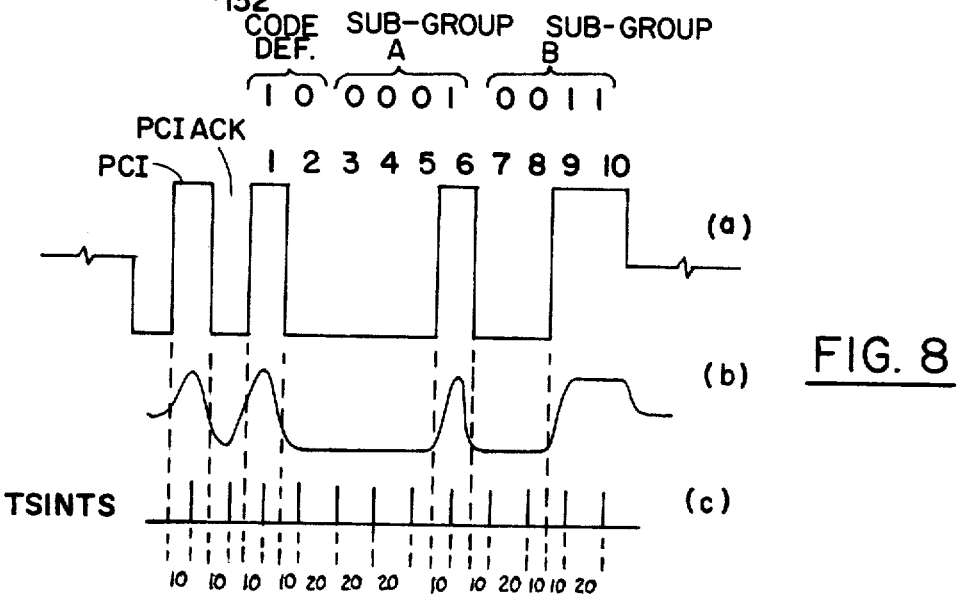
Figure 5:
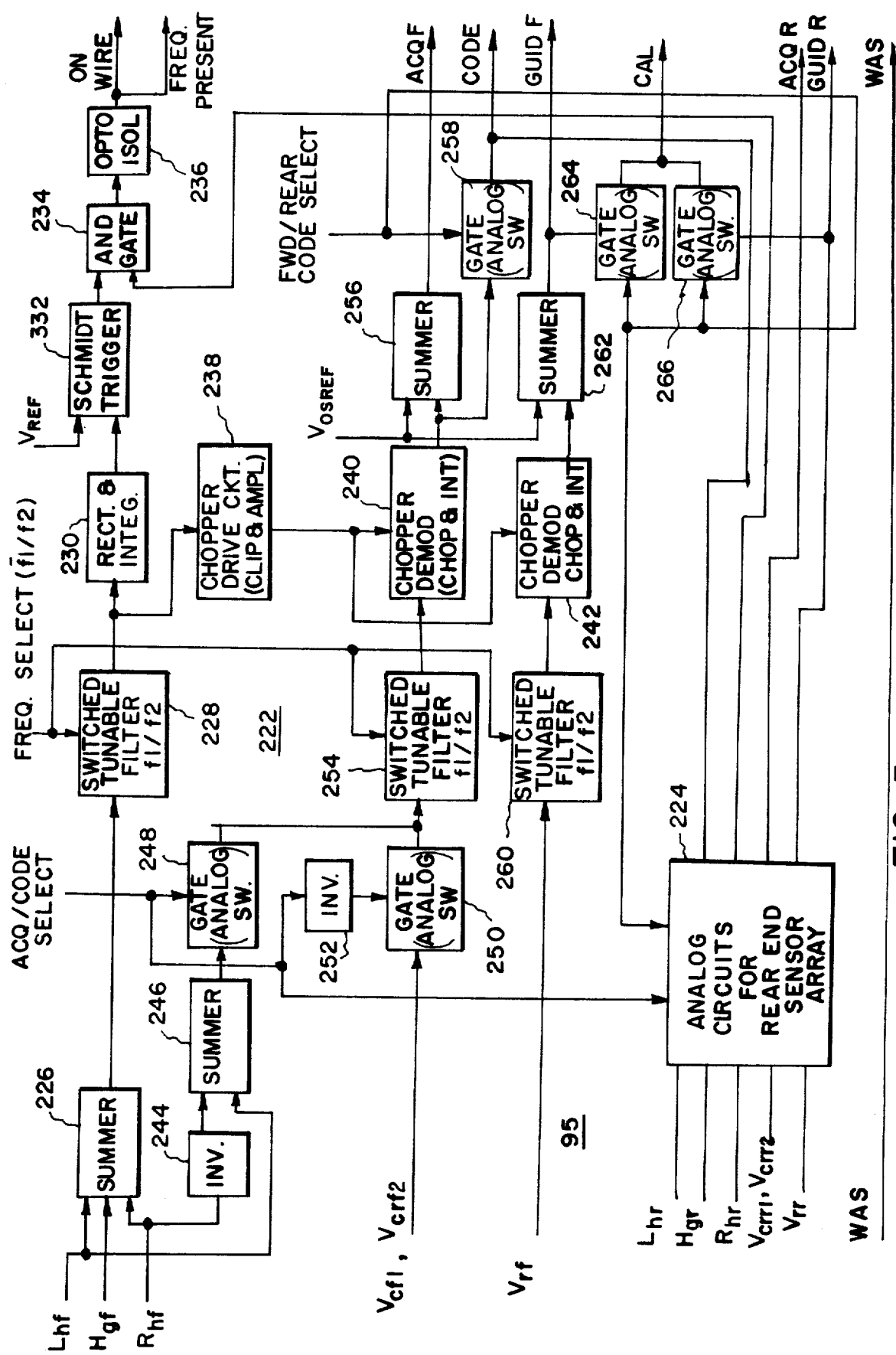
Figure 7:
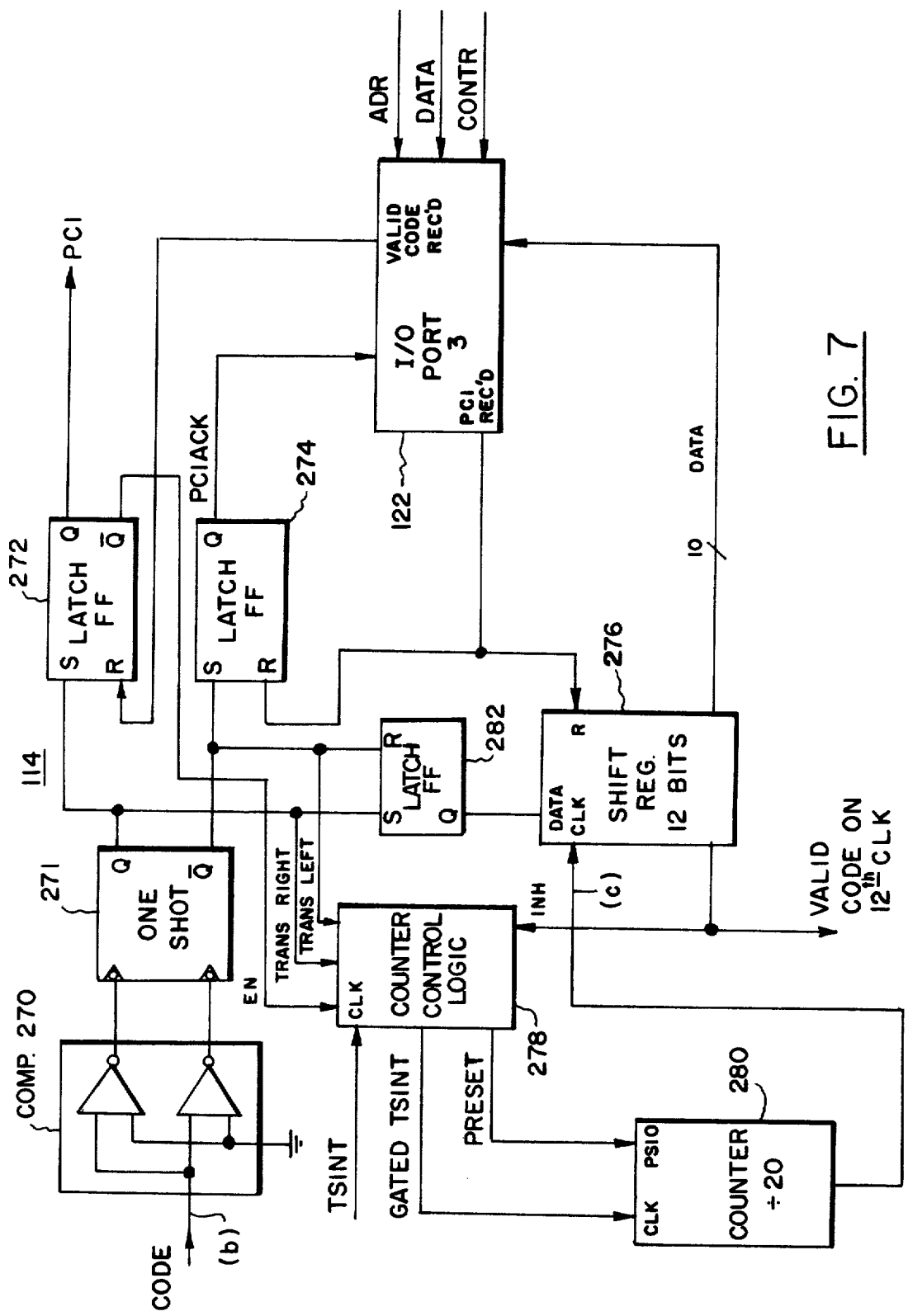
Figure 9C:
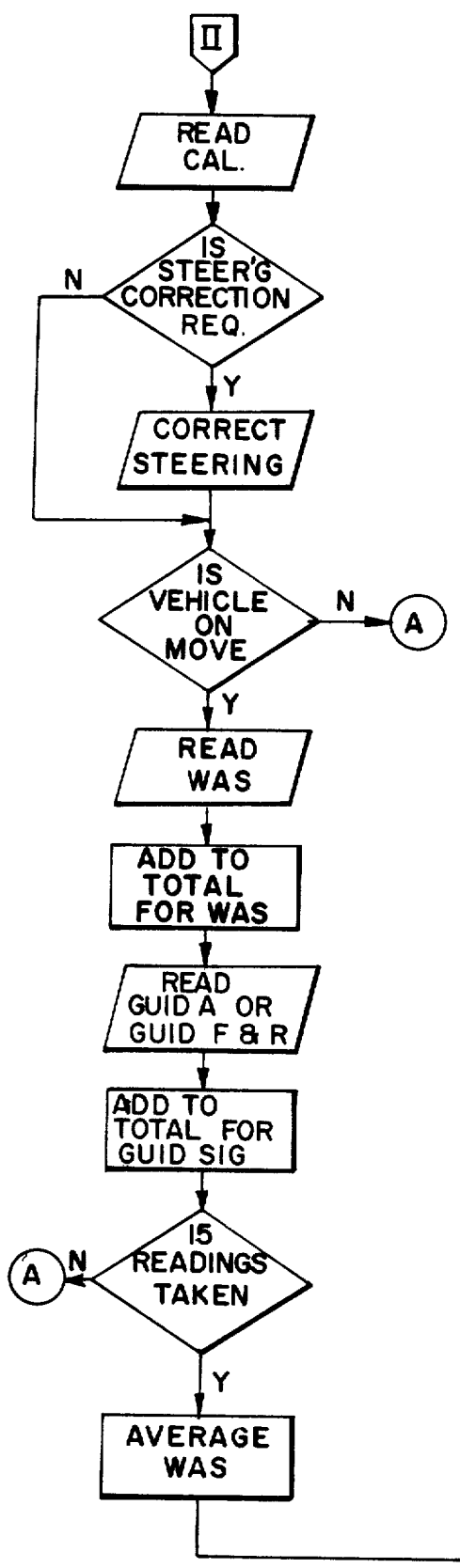
Figure 9C:
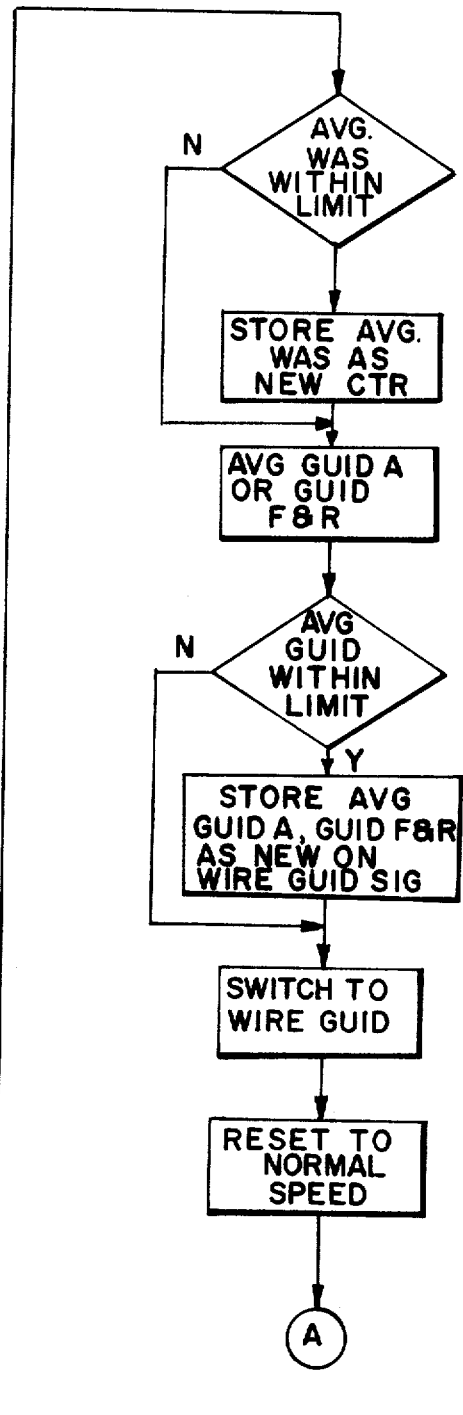
Figure 9B:
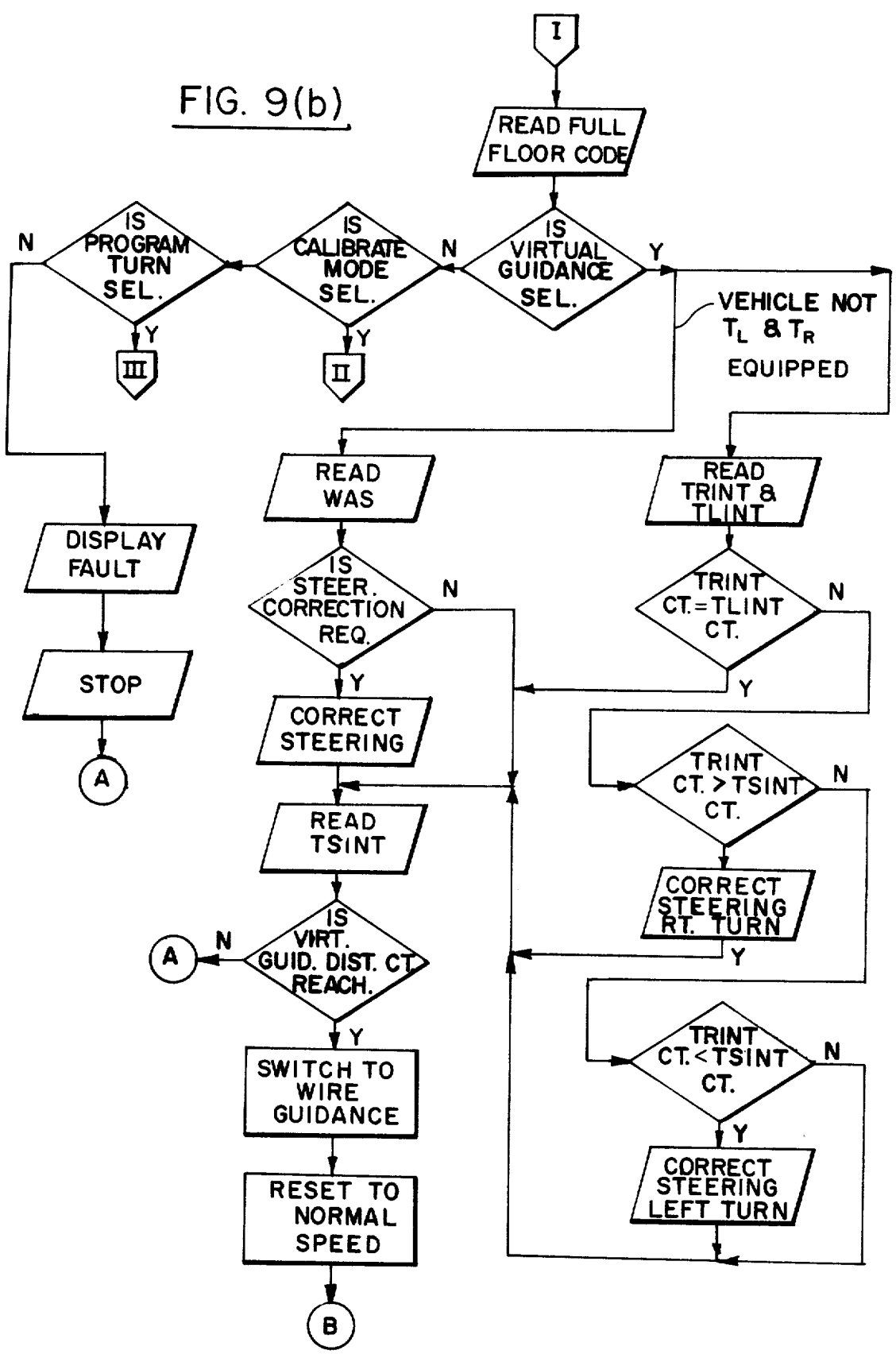
Figure 9D:
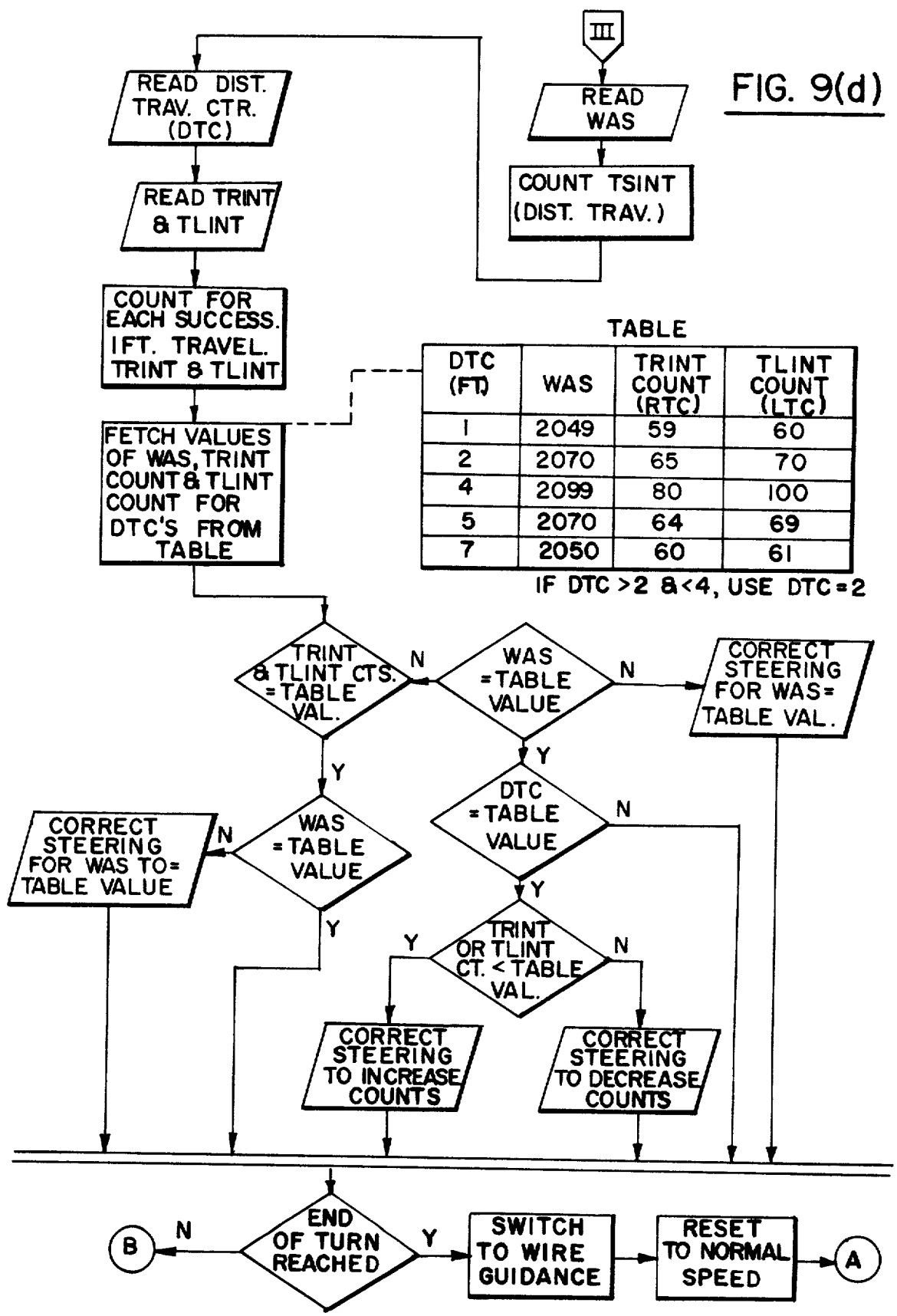
Figure 9E:
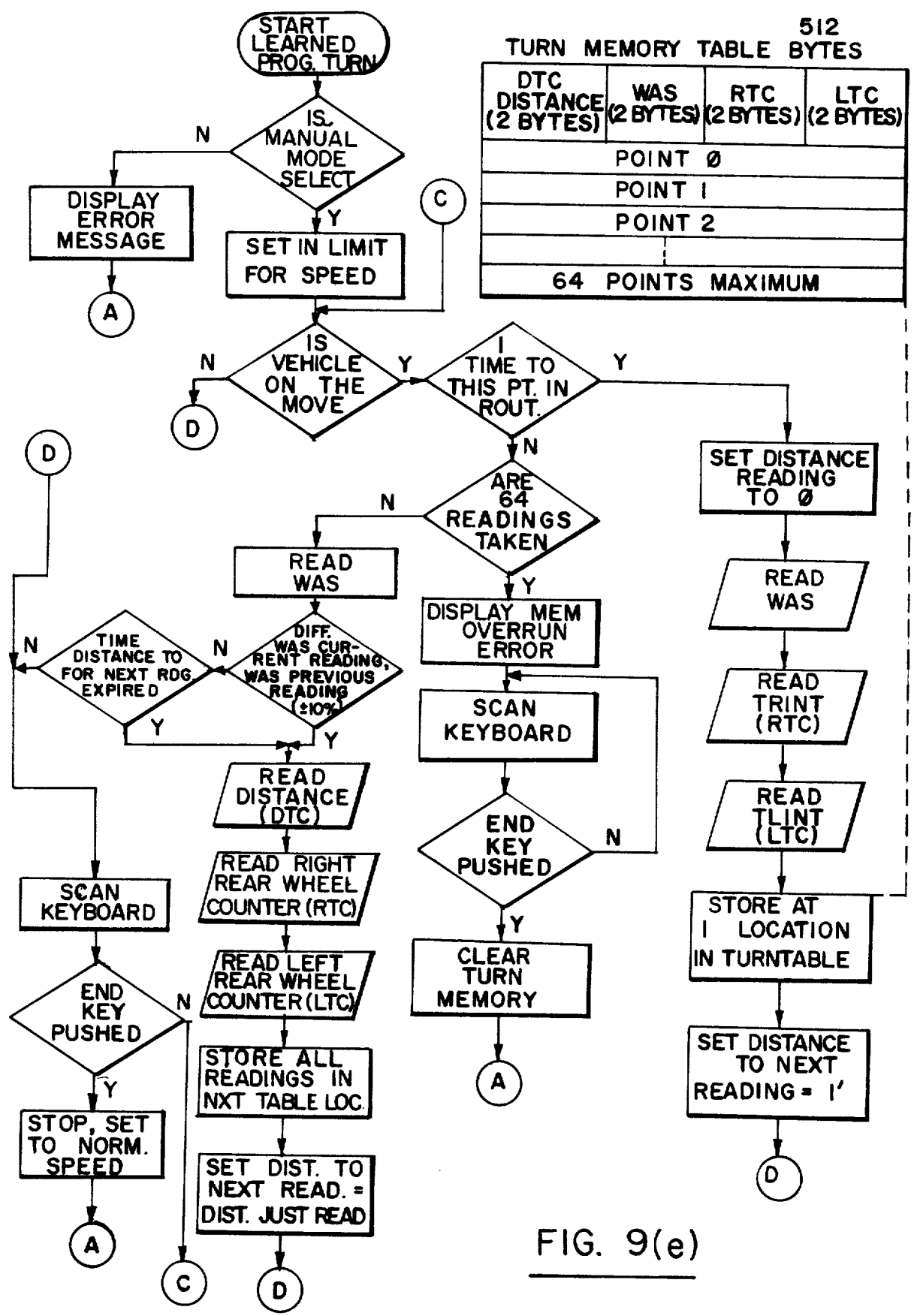
Figure 10:
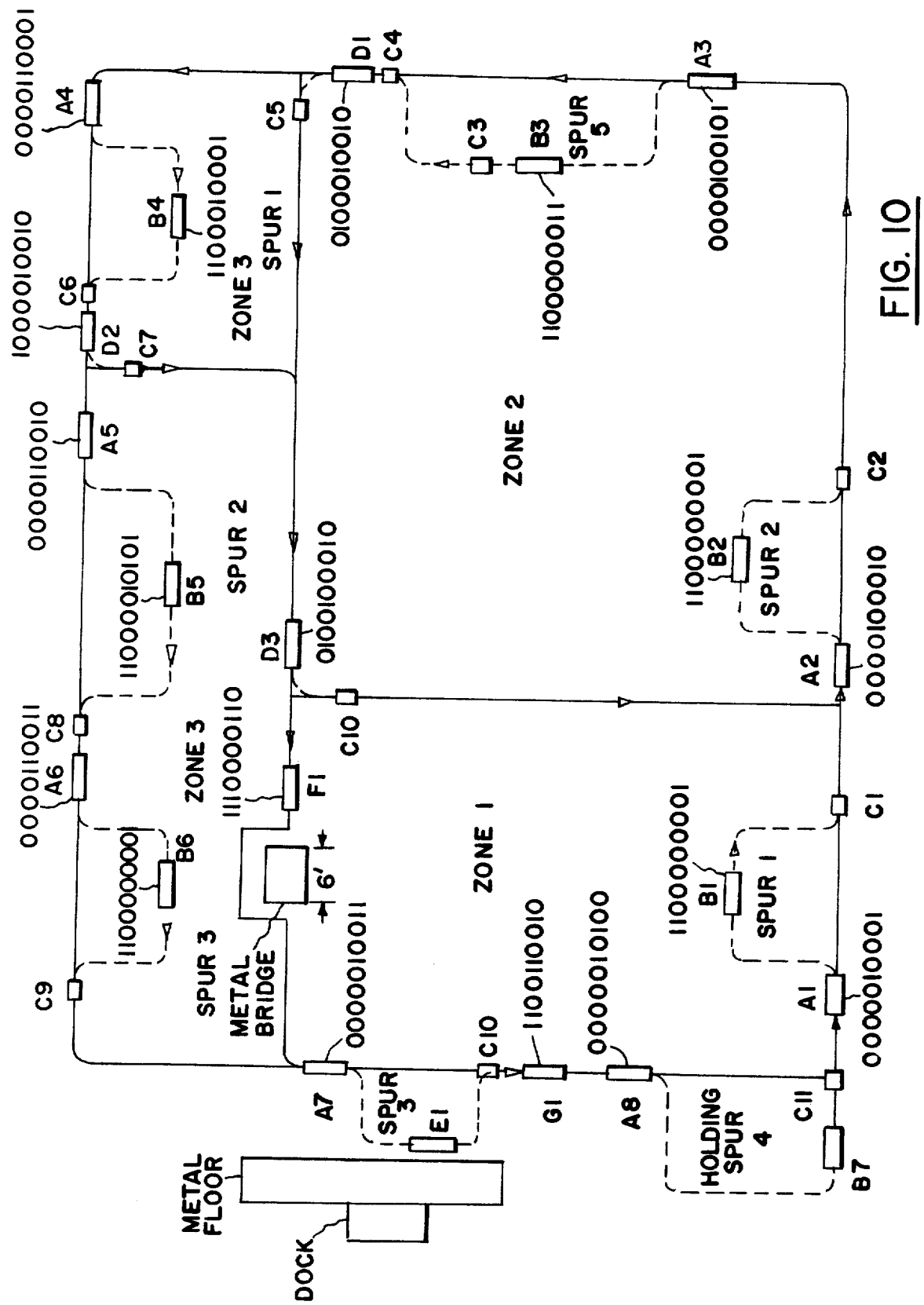

FIG. 3(a) and FIG. 3(b) is a block diagram illustrating an AGVS embodying the invention and showing the guidance and sensor means which may be incorporated in guided vehicles which is illustrated in FIGS. 1 and 2;

FIG. 4 is a block diagram illustrating the analog circuits of the system shown in FIG. 3(a) and FIG. 3(b) which may be used on vehicles having the guidance and sensor means illustrated in FIG. 1 are employed in the system;

FIG. 4a. are waveforms which are produced in the operation of the FIG. 4 circuits;

FIG. 5 is a block diagram of analog circuits which may be used when a vehicle having sensor means such as shown in FIG. 2 are employed in the system;

FIG. 6 is a block diagram illustrating data acquisition circuits of the system shown in FIG. 3(a) and FIG. 3(b);

FIG. 7 is a block diagram illustrating the code reader circuits of the system shown in FIG. 3(a) and FIG. 3(b);

FIG. 8 shows a typical floor code pattern which may be read and waveforms of signals derived from such a pattern as well as signals produced while reading the floor code in the operation of the code reader circuit shown in FIG. 7;

FIG. 9, which is split up into successive FIGS. 9(a)(1), 9(a)(2), 9b, 9c, 9d and 9e, is a flow chart defining the microprocessor controller which is made up of the CPU, memory and associated I/O ports and circuits which are illustrated in FIG. 3(a) and FIG. 3(b); and FIG. 10 is a layout of a guidepath defined by guidewires which carry signals of different frequencies $f_1$, shown by the solid line and $f_2$, shown by the dash line, and the location of floor code patterns which control operating modes of the vehicles as they are guided along the path.

Referring to FIG. 1, there is shown the disposition of the sensors, a driving and steering mechanism, and load bearing wheels of an automated guided vehicle used in the AGVS system provided by the present invention. In this view the rectangle 10 indicates the outline of the vehicle. The forward direction of travel of the vehicle is indicated by the arrow 12. The width of the vehicle, which is the dimension of the rectangle perpendicular to the direction of the arrow 12, may for example be from 30 to 60 inches. The length of the vehicle may be from 48 to 96 inches. These dimensions are for typical installations. The vehicle is supported on a steering and drive wheel 14 and on two load bearing wheels 16 and 18. While a three wheeled vehicle is preferred, the system may be embodied in a plurality of configurations, such as a four wheeled vehicle, with the steering and drive wheel 14 being one of the forward wheels.

A rotating platform 20 mounts the steering and drive wheel 14 on a yoke 22 which is turned by a steering motor 24 coupled to a shaft 26. A belt drive or other power transfer mechanism may be used to couple the steering motor to the shaft. This coupling is indicated by the dashed line 28 between the steering motor 24 and shaft 26. Alternatively, the steering motor may turn the platform 20. Coupled to the shaft 26 is a wheel angle sensor (WAS) 30. The sensor 30 may be a potentiometer which produces output signals in the form of a DC voltage, the amplitude and polarity of which indicates the angular position of the steering and drive wheel 14 with respect to the center line between the ends of the vehicle through the axis of the shaft 26.

A traction or drive motor 32 is mounted on the platform 20 and is coupled by way of a drive mechanism 31 to the shaft 34 on which the steering and drive wheel 14 is journaled in the yoke 22. An extension of the shaft 34 is located between the drive 31 and the yoke 22. The drive may be a gear reducer such that the input shaft 33 to the drive 31 executes more revolutions than the output shaft 34 which drives the steering and drive wheel 14. A tachometer 36, indicated as $T_S$ in FIG. 1 is coupled to the drive motor shaft and provides output pulses depending on the distance of rotation of the shaft. In a preferred embodiment of the invention the output pulses, each may be provided for each one/tenth of an inch of travel of the vehicle. A shaft encoder (electro magnetic or Hall effect type) on the drive motor output shaft 33, which encoder is the part of the tachometer 36, may be used to provide the pulses.

Five coils are mounted on a plate 38 attached to the platform 20. These coils provide other sensors used in the guidance of the vehicle. Assuming a center line through the platform and through the axis of the shaft 26 which is along the center line of the vehicle when the steering and drive wheel is straight, the coils $L_h$ and $R_h$ are mounted horizontally on opposite sides of this center line. The $L_h$ and $R_h$ coils are coaxial and provide output signals depending upon the angular deviation from the wire of the center line, which extends through the plate 38 and axis of the shaft 26. The $L_h$ and $R_h$ coils as well as the other coils on plate 38 may be similar in construction. Each contains a large number of turns, say several hundred turns, on a non-magnetic spool. The $L_h$ and $R_h$ coils may be disposed with their outer ends, which are furthest from the center line, a few inches from each other, for example four inches apart, when guidance accuracy with respect to the guide wire of two inches either side of the guide wire is desired. Other displacements of these coil, $L_h$ and $R_h$, may be used depending upon the accuracy of guidance required.

Another coil, indicated as $V_{rc}$, is disposed on the plate 38 with its axis vertical and perpendicular to the axes of the coaxial $L_h$ and $R_h$ coils. The $V_{rc}$ coil is used to provide reference or calibrating signals. Two other coils, $V_{cr1}$ and $V_{cr2}$, are used for code reading and provide output signals, when inductively coupled to the wire, from which commands as to the operating modes of the vehicle and as to the routing of the vehicle are obtained. These coils $V_{cr1}$ and $V_{cr2}$ may be referred to as the code reading coils. They are closely spaced to each other along the center line through the plate 38 and axis of the shaft 26. The $L_h$ and $R_h$ coils are interconnected to provide output signals corresponding to the difference in the signals induced therein from the wire in the analog circuits of the system which will be described in greater detail in connection with FIG. 4. The code reading coils are interconnected in bucking relationship so as to respond only to code signals represented by patterns in the wire which are referred to herein floor codes.

The two load bearing wheels are coaxially disposed near the rear of the vehicle. The shafts of these wheels may be connected to tachometers 40 and 42 indicated as $T_L$ and $T_R$ in FIG. 1. When these tachometers 40 and 42 are used, and they may be omitted in order to simplify and reduce the cost of the system, they provide output signals which may be used for guidance of the vehicle and thus function as guidance sensors in addition to the wheel angle sensor 30 and the $L_h$ and $R_h$ coils.

Reference may be made to FIG. 10 for a greater understanding of the guide path which is defined by the guide wires to which the inductively coupled sensors provided by the coils respond. There is a main guide path defined by wires shown by the solid line. These wires may be embedded in the floor. The return of the wires are not shown, but it is apparent that these return ends are connected to a generator which passes a current of frequency of $f_1$, suitably 2000 Hertz through the main guide wire. The guide wire divides the area, such as the floor of warehouse, into various zones. Three such zones, zone 1, zone 2, and zone 3 are shown in FIG. 10. Separate generators may be used for the wires which define each zone. The dashed lines represent another guide wire which carry a current of frequency $f_2$, suitably 3000 Hertz. The $f_2$ wire defines spurs off the main guide path and in some cases turns the between legs of the main guide path. The floor codes are defined by blocks indicated as $A_1, A_2, A_3 \ldots, B_1, B_2, B_3 \ldots, C_1, C_2, C_3 \ldots, D_1, D_2, D_3 \ldots, E_1, F_1,$ and $G_1$, these floor codes occupy up to 20 inches of the guide path. Accordingly it will be appreciated that their size is greatly exaggerated in relation to the guide path in FIG. 10.

The floor codes are provided by patterns of the guide wire which run transverse thereto, both left and right. A typical floor code pattern is illustrated in FIG. 8 curve (a). This figure will be discussed hereinafter in connection with the reading of floor codes. There are various guidance modes defined by these floor codes. The floor codes also provide digital signals to which the microprocessor controller carried on the vehicle responds to select different operating modes and the output from different guidance sensors of the vehicle. It would be appreciated certain of these guidance sensors are not dependent upon the wire and the signals detected therefrom. These include the wheel angle sensor 30 and the rear wheel tachometer sensors 40 and 42. Other sensors are dependent upon the wire such as the coils on the plate 38.

FIG. 2 shows the layout of another vehicle which may be used in the AGVS provided by the invention. FIG. 2 shows the plan view layout of the sensors and the steering and drive wheel and load bearing wheels of this vehicle. The vehicle may for example be a typical guided vehicle of the type which is commercially available, but incorporating sensors which afford accuracy and reliability and routing provided by the invention.

It will be noted that while an electric motor driven steering and drive wheel unit is disclosed in FIG. 2 and FIG. 1 and used in accordance with the preferred embodiments of the invention, other steering and traction systems, which may for example involve the use of hydraulic motors, may be used.

In FIG. 2 as in FIG. 1, a steering and drive wheel 44 and load bearing wheels 46 and 48 are provided. This steering and drive wheel 44 is mounted by a yoke 50 and vertical shaft 52 on a rotating platform 54. A steering motor 56 drives the shaft 52. The axis of the shaft is along the axis of the center line which runs from end to end through the vehicle from the front end 58 to the rear end 60 thereof. The forward direction of the vehicle is also indicated by an arrow 62.

A traction or drive motor 64 is coupled through a drive 66 to a shaft 68 which drives the steering and drive wheel 44. The drive motor 64 and drive 66 are mounted on and rotatable with the platform 54. As described in connection with FIG. 1, a wheel angle sensor 70, which likewise may be a potentiometer which provides output signals varying in amplitude and polarity depending upon the travel direction of the vehicle and angular orientation of the steering and drive wheel 44 with the respect to the center line of the vehicle, is coupled to the steering shaft 52. A tachometer 72, also indicated as $T_S$, is coupled to the drive motor shaft and provides output pulses; suitably a pulse for each one-tenth inch of travel of the vehicle. It will be seen that the steering and traction control of the vehicle shown in FIG. 2 is much like that of the vehicle shown in FIG. 1. Again like the vehicle shown in FIG. 1 the steering and drive wheel may be one of the wheels of the four wheeled vehicle, preferably one of the front wheels thereof.

The arrangements of sensors used in the vehicle of FIG. 2 is somewhat different than that used in the vehicle shown in FIG. 1. There are similar arrays or sets of sensors which inductively coupled to the guide wire at the front and rear end of 58 and 60 of the vehicle. Consider first the sensor array at the front or forward end 58 of the vehicle. The coils of this array as well as the rear end array are similar in design to the coils discussed above in connection with FIG. 1. A first sensor is provided by a pair of left and right horizontal coils, $L_{hf}$ and $R_{hf}$. These coils are used principally in the acquisition of the wire and are called acquisition coils, but may also be used in the guidance of the vehicle around turns. The $L_{hf}$ and $R_{hf}$ coils are coaxial with each other. Their axes are perpendicular to the center line of the vehicle and they are disposed well outboard of the center line, suitably approximately two feet from the center line. It may be noted that the vehicle shown in FIG. 2 is somewhat longer than the vehicle shown in FIG. 1. Both vehicles may be of the same size range in a practical application. However, since the vehicle of FIG. 2 is typical of commercially available guided vehicles which have a longer aspect ratio of length to width, it is so shown in FIG. 2.

There is also another horizontal coil indicated as $H_{gf}$ which is also coaxial with the $L_{hf}$ and $R_{hf}$ coils. The center line bisects the $H_{gf}$ coil. This coil is used for guidance when the vehicle is in close proximity to the wire in conjunction with a vertical coil $V_{rf}$ and the analog circuits shown in FIGS. 3 and 5, which will be discussed more fully hereinafter. The $V_{rf}$ coil is disposed with its axis perpendicular to the center line of the vehicle. When the vehicle is over the wire, the axis of the $V_{rf}$ coil is also perpendicular to the wire. Code reading is a function of two other vertical coils which are disposed inboard of the vehicle and closely adjacent to each other. These coils are the $V_{crf1}$ and $V_{crf2}$ coils. The axes of these vertical code reading coils are also perpendicular to the center line of the vehicle and are along the center line. The acquisition coils $L_{hf}$ and $R_{hf}$ may be mounted on the underside of the vehicle on pads 74 and 76. Another pad 78 is used to mount the guidance coils $V_{rf}$ and $H_{gf}$ as well as the code reading coils $V_{crf1}$ and $V_{crf2}$.

The sensor array provided by the coils at the rear end 50 of the vehicle is disposed similarly to the array at forward end of the vehicle, but generally in mirror image relationship. There are two acquisition coils, $L_{hr}$ and $R_{hr}$, which like the $L_{hf}$ and $R_{hf}$ coils are horizontal coils, which are coaxial with their axes perpendicular to the center line of the vehicle. These coils are used for acquisition of the wire when the vehicle is travelling in reverse or rearward direction. The $L_{hr}$ and $R_{hr}$ coils may be mounted on pads 80 and 82 to the underside of the vehicle. The rear end array also has guidance coils made up of a horizontal coil $H_{gr}$ and a vertical coil $V_{rr}$. The horizontal coil $H_{gr}$ has its axis coaxial with the axis of the acquisition coils $L_{hr}$ and $R_{hr}$. The vertical coil $V_{rr}$ has its axis perpendicular to and along the center line. Code reading coils $V_{crr1}$ and $V_{crr2}$ are also disposed along the center line of the vehicle inboard of the $H_{gr}$ coil. These code reading coils $V_{crr1}$ and $V_{ccr2}$ are used for reading the floor codes when the vehicle is travelling in the reverse direction. A pad 84 may be used to mount these rear end guidance and code reading coils on the under side of the vehicle. The pads 74 through 84 enable the coils to be located in proper vertical relationships from the floor for maximal signal induction therein.

The rear wheels 46 and 48 are provided with tachometers 86 and 88 indicated as $T_L$ for left wheel tachometer and $T_R$ for the right wheel tachometer. These tachometers are connected to the shafts of the load bearing wheels and provide output signals for guidance of the vehicle which are independent of the wire.

Referring to FIG. 3(a) and FIG. 3(B), there is shown a controller which is carried on each vehicle and may be used either with the sensors of the vehicle shown in FIG. 1 or the sensors of the vehicle shown in FIG. 2. The FIG. 1 wire sensing coils may be provided with preamplifiers which can be mounted on plate 38, and are shown as wire sensing coils and pre-amplifier A in block 90 in FIG. 3. A single output line from the coils $V_{cr1}$ and $V_{cr2}$ is indicated, since these coils are connected in bucking relationship. Separate outputs are provided of the $L_h$, $R_h$ and $V_{rc}$ coils.

Also mounted on the vehicle is the steering wheel angle position sensor (WAS) which is indicated as 30 in FIG. 1 and 70 in FIG. 2 (and as 30, 70 in FIG. 3(a)). This sensor provides a single output for use in the system. In the case of the FIG. 2 vehicle, where front and rear end sensor arrays are used, the wire sensing coil and their associated preamplifiers 92 and 94 for the array at the front (F) on the rear (R) of the vehicle provide single outputs from the various coils thereof as indicated in FIG. 3(a), except that the code reading coils provide but one output since there they are connected in bucking relationship.

The vehicles are desirably equipped with safety signal generators 96. These generators may be a bumper switch which is activated by a tactile bumper surrounding the vehicle. An optical scanner scans a zone, for example focused 6 feet ahead of the vehicle. An object in this zone is detected optically and transduced into a signal which triggers a latch circuit and signals the vehicle to slow down. Another optical detector scans a zone ahead of the vehicle but closer to the vehicle, say two feet ahead, and provides a signal which also triggers a latch to signal the vehicle to stop. The bumper switch and latches operated by the optical detectors provide interrupts, indicated as (BUMPER), (STOP), and (SLOW) which are used in the system to control the travelling speed of the vehicle and causes it to stop for safety purposes. In other words, a plurality of proximity detectors are provided in order to insure the safety of the vehicles and personnel and equipment in its environment.

Analog circuits 98 receive the output signals from the wheel angle sensor 30 or 70, from the wire sensing coils and preamplifiers A 90, if the vehicle is equipped with sensors as shown in FIG. 1, or from the wire sensing coils and preamplifiers (F for the front array) 92 and (R for the rear array) 94, if the vehicle is equipped with sensors as shown in FIG. 2. The analog circuits 98 derive a plurality of analog output signals from the wheel angle position sensor and the various wire sensing coils, depending on how the vehicle is equipped. The output GUID A/F is the guidance signal obtained from the sensor coils placed in proximity with the wire. When the wire sensing coils and preamplifiers 90 are used, these are the $L_h$ and $R_h$ coils. When the wire sensing coils and preamplifiers 92 are used, the output is derived from the $V_{rf}$ and $H_{gf}$ coils. In short, GUID A/F is the guidance signal from the sensors at the front of the vehicle. The output GUID R is the output from the sensor coils $V_{rr}$ and $H_{gr}$ at the rear of the vehicle. ACQ F and ACQ R are the outputs from the acquisition coils at the front of the vehicle and at the rear of the vehicle when the vehicle is equipped as shown in FIG. 2. Thus, the $L_{hf}$ and $R_{hf}$ coil outputs are processed in the analog circuit 98 to produce ACQ F, while the $L_{hr}$ and $R_{hr}$ outputs are processed to produce ACQ R.

The CAL output is obtained from the $V_{rc}$ coils when the vehicle is equipped with the wire sensing coils and preamplifiers 90. Calibration is carried out during the calibrate mode of operation of the system with the GUID F and GUID R output when the vehicle is equipped with the wire sensing coils and the preamplifiers 92 and 94 as shown in FIG. 2.

The ON WIRE output is derived from by the analog circuits 98, when the coils which sense the wire are in close proximity therewith, for example plus or minus two inches from the wire. In the case of the wire sensing coils and the preamplifiers A, the $L_h$ and $R_h$ coil outputs are processed to provide ON WIRE. In the system equipped with the wire sensing coils and preamplifiers 92 and 94, the ON WIRE signal is obtained from all of the horizontal coils at the front and rear of the vehicle; i.e., from $L_{hf}$, $R_{hf}$, $H_{gf}$ and $L_{hr}$, $R_{hr}$ and $H_{gr}$. Another output obtained from the analog circuits is that the guide wire which is selected is present under the vehicle (FREQ PRES). This is determined by the frequency of the signal emitted by the wire, either $f_1$ or $f_2$. The outputs from the same coil as used to provide the ON WIRE output are processed in the analog circuits 98 to provide FREQ PRES.

The analog circuits 98 also provide the code signals, CODE, from the code reading coils. In the case where the vehicle is equipped as shown in FIG. 2, either the forward or rear code reading coils are selected to provide the CODE output.

Control signals to the analog circuits 98 are the FWD/REAR CODE SELECT signal which determines which set of code reading coils are used to derive the CODE signal, the ACQ/CODE SELECT, which enables dual use of circuitry in the analog circuit 98 to obtain either the ACQ F and ACQ R outputs or the CODE signal depending upon the operating mode of the system when employing vehicles equipped as shown in FIG. 2 (with the sensing coils and preamplifiers 92 and 94). Other inputs to the analog circuits are the CAL SELECT and FREQ SELECT inputs which control the circuits to respond to different ones of the guide wires and to operate in the calibrate mode.

Manual controls 100 may be contained in a manual control box connected by umbilical cord to the vehicle. Manually generated guidance signals, for example produced by manually controlled potentiometers are generated by the manual controls and are indicated in FIG. 3(a) as the GUID M and SPEED M outputs thereof. A forward/reverse switch in the controls 100 produces the FWD/REV control signal which may be in the form of a level. Another switch selects either automatic or manual operation and provide another control level indicated as AUTO/MAN. An emergency power switch may be included in the manual controls and similar switches may be located on the vehicle where they may be readily accessible, for example on the sides and the rear of the vehicle. The system enables the emergency power off switches to be used either in the automatic or manual mode. The vehicle may be operated at any time in the manual mode. To obtain the automatic mode for operator-less, automated guidance of the vehicle, the operator places the auto/manual switch in the automatic mode. The vehicle then slows to a fraction, say one-eigth of maximum speed. The operator is still manually able to steer the vehicle and control its speed, but will not be able to exceed the maximum slow speed limit. The system then responds to the ACQ F or ACQ R outputs in the case of vehicles equipped as shown in FIG. 2 and to the ON WIRE and FREQPRES outputs. The vehicle comes to a stop over the wire and speed and direction is controlled in response to the guidance signals via the computer controller shown in FIG. 3. The guide wire which carries frequency $f_1$ or the guide wire which carries frequency $f_2$ may be acquired. If both guide wires are present under the vehicle, the system selects the wires carrying frequency $f_1$ to develop the guidance signals used for automatically guiding the vehicle. After the vehicle is acquired, the operator may place the manual controller, in its storage compartment on the vehicle, and may program a destination or sequence of destinations (routing) by means of the keyboard 102. The vehicle then restarts and proceeds under automated guidance control. The routings are displayed on an alpha numeric LED display 104 which may have four digits. The display and keyboard are interfaced in the system by keyboard display and control circuits 106.

There are other inputs to this system which may be noted from FIG. 3(b). These are a special function select switch 108 and a traffic control input indicated as TRAFFIC CONTR on the left side of FIG. 3(b). The special function select switch 108 may be a series of switches which, when actuated, enable the system to respond to special function codes which are entered by way of the keyboard 102. These codes, for example allow the operator to monitor the signals produced in various parts of the system. The display 104 will indicate these signals. At the same time a special function status display 110, such as LEDs (lightemitting diodes), will indicate that the system is under test. Accordingly diagnostics and self testing of the system may be performed.

The traffic control input may occur at intersections and at spurs in the guide path (see FIG. 10). The vehicles are equipped with transmitters which induce signals of much higher frequency than on the guide wire (much higher than the $f_1$ and $f_2$ signal) into the wire. These signals are detected on the vehicle and used to provide the TRAFFIC CONTR input into the system. This indicates a full spur condition, to a vehicle at the entrance to a spur, or that the main guide path is occupied, to a vehicle leaving the spur. When a vehicle notes the occurrence of a TRAFFIC CONTR input when reading a floor code at the entrance to an occupied spur, the system will cause the vehicle to continue on the main guide wire and not take the spur. The vehicle will return to the spur later and again try to enter it. When exiting the spur, the TRAFFIC CONTR input will cause the vehicle to stop and remain stopped until the absence of the input is noted or the vehicle is placed into the manual mode by the manual controls 100.

The tachometers (36 in the case of the vehicle shown in FIG. 1 and 72 in the case of the vehicle shown in FIG. 2) and the load wheel tachometers $T_L$ and $T_S$, when the vehicle is equipped with such tachometers, provide their pulses or output control signals indicated TSINT for the drive wheel tachometer ($T_S$) 36, 72 and TRINT and TLINT for the load wheel tachometers $T_L$ and $T_R$.

Data acquisition circuits 112 received the analog signals used for guidance, acquisition and calibration from the analog circuits 98. The analog circuits 98 also process the signals from the wheel angle position sensor and provide the WAS output to the data acquisition circuits 112. The manual controls output GUID M and SPEED M are also inputted to the data input acquisition circuit 112. The speed control in the automatic guidance mode is obtained through the use of the tachometer $T_S$ 36 or 72 and TSINT pulses therefrom.

A code reader 114 responds to the code signals from the analog circuits 98 and translates these signals into digital signals. These are outputted on different lines. The code data, representing certain command and routing signals, is outputted as a ten bit signal on CODE DATA lines from the code reader. The precode signal derived from the initial bit of the floor pattern is outputted from the code reader on a PCI line. The next bit is outputted as PCIACK signal on another output line from the code reader. Still another output line from the code reader 114 provides a signal when a valid code is read from a floor code pattern. The data acquisition circuits 112 also provide outputs on the data bus. The analog signals which are inputted to the data acquisition circuit are translated into a twelve bit digital signal which is outputted in concatenated form and successive time slots on the data bus as an 8 bit and 4 bit grouping, so that an 8 bit data bus can accommodate the twelve bit digitized, analog signals. This enables high resolution, operation and accurate guidance control using an 8 bit on-board microprocessor. Of course, the concatenated sequence may not be required in the implementation, if lower resolution or a larger data bus is used.

The main control component of the system shown in FIG. 3(a) is a central processing unit or CPU 116. A microprocessor, suitably with an eight-bit accumulator (e.g., Intel type 8085) may be used. It is connected to an eight-bit data bus which is a bi-directional data bus, to a number of input/output circuits (chips) indicated as I/O port (1) 118, I/O port (2) 120, I/O port (3) 122, and I/O port (4) 124. Intel chips type 8255 may be used as these I/O ports in conjunction with a 8085 CPU. The CPU and I/O ports are also interconnected by an address bus, suitably 16 bits and by control lines, which may be 7 in number and are referred to as a control bus. RAM and ROM memory circuits 126 are connected to the CPU and the ports by the data address and control bus. The memory may have eraseable programable read only memory, as its ROM or read only memory, to contain the program which establishes the system operations in accordance with the invention. The RAM or random access memory is used for variables which change during the operation of the system and portions of the memory may cooperate with the CPU to provide counters which are used in carrying out system operations. The processor 116 accesses the memory in normal fashion by placing the program counter output on the address bus, with appropriate memory control and timing signals on the control bus. The control bus also carries commands for reading, writing and other input and output operations to the I/O ports 118 through 124. The keyboard and display control circuits 106 are also connected to the processor 116 by way of the data address and control buses. These circuits 106 may be provided by an Intel 8279 chip when the CPU is an 8085 chip.

An interrupt priority circuit 128 is provided by an interrupt controller chip, suitably an 8259 Intel device. Various inputs which were discussed above and are shown to the left of the interrupt priority circuit 128 in FIG. 3 operate as interrupts in the processor 116. These interrupts are decoded and stored in the interrupt priority circuit 128, thereby reducing overhead in the processor 116. Timer circuits 130, suitably provided by an Intel 8253 chip, perform system timing and counting functions for the processor 116 and are connected to the address, data and control buses. These timer circuits provide timing interrupts, TMINT to notify the processor of the completion of a timing or counting task. The timing interrupts go to the interrupt priority circuit 128.

I/O port (1) 118 is used for diagnostic requests called for by the special function select switches 118. Status indications that diagnostic operations are going on are indicated by the special functions status display 110. This I/O port 118, like the other I/O ports 120, 122 and 124 and the keyboard and display control circuits 106, are polled by the CPU 116, in accordance with the program, continually during system operation.

The second I/O port 120 handles the information from the manual controls 100 and data acquisition circuits 112, where it generates the select commands, namely FREQ SELECT, CAL SELECT, ACQ/CODE SELECT and FWD/REAR CODE SELECT. Control lines from I/O port (2) 120 to the data acquisition circuits 112 address a multiplexer 132 therein (See FIG. 6) and control an analog-to-digital converter (ADC) 134 which contains its own I/O port. A control line from the ADC 134 to the I/O port 120 provides a status signal by which the processor 116 can determine whether data is available to be read out of the ADC representing different ones of the digitized analog signals which are multiplexed by the multiplexer 132 in the data acquisition circuits 112.

The third I/O port 122 handles the data from the code reader 114. The PCI signal is handled as an interrupt by the interrupt priority circuit 128. The PCI ACK data is handled by the I/O port 122. The code reader is controlled by the I/O port 122. The VALID CODE signal from the code reader 114 is also handled as an interrupt by the interrupt priority circuit 128, so as to notify the processor 116 when a complete code has been read and valid code data is available at the I/O port 122. The inputs from the timer circuits 130, interrupt priority circuit 128, keyboard and display and control circuits 106 and the first three I/O ports 110, 120 and 122 provide the necessary inputs to the processor 116.

The processor 116 conditions the system to function in its various operating modes, namely under automatic or manual control, with different ones of the sensors which provide guidance control over different portions of the path either dependent on the wire or independent of the wire (the former being referred to as wire guidance and the latter being referred to as the virtual guidance), and for the execution of stops, turns and other maneuvers.

The I/O port 122 also handles the signals processed by the CPU 116 and provides steering control by controlling the steering motor 24 or 56 and control over whether the vehicle is to travel in the forward or reverse direction. Braking and stopping of the vehicle and various warning and alarm indications are also controlled via the I/O port 122. The steering motor 24 or 56 is preferably a direct current motor. The amplitude of the current supplied to the motor which determines how far it turns is obtained from a servo amplifier 136. The servo amplifier is normally inhibited from delivering any current to the steering motor so that it remains in the angular position assumed when the current has stopped flowing therethrough. A steering correction enable signal is applied to the servo amplifier 136 during periods of time when steering corrections are commanded by the controller 116 through the I/O port 122. These steering correction signals are digital signals which are converted into analog form by a digital to analog converter (DAC) 138. The analog signals are applied with a feedback signal (WAS) which is obtained through the wheel angle position sensor 30 or 70 through the analog circuit 98. The directional control for the steering of the vehicle is obtained from the analog correction voltage from the DAC 138. For example, a zero voltage output indicates no correction, plus ten volts indicates a maximum correction towards the left of the center line of the vehicle and of the wire and a minus ten volts correction indicates a maximum deviation towards the right of the center line and the wire. The WAS signal provides some instantaneous feedback for position damping of the mechanical correction the angular position of the steering wheel 14 (FIG. 1) or 44 (FIG. 2).

The drive or traction motor 32 or 64 is also preferably a DC motor. The current to the motor is reversed in polarity by a directional control switch or reversing contactor 142. The direction control 142 is operated by the forward and reverse control commands (FWD and REV) from the third I/O port 122. The drive or traction motor 32 or 64 is equipped with a braking mechanism 144 which may be an electro-magnetically operated mechanical brake or a dynamic brake mechanism. Drive or traction motors are commercially available with such mechanisms and such commercially available motor units may be used on the vehicles.

A brake control command from the I/O port 122 operates the brake mechanism 144. The brake mechanism is operated to release the brake by a bumper bypass command from the fourth I/O port 124. Upon the bumper switch being activated, the brake command is generated to immediately stop the vehicle. Upon detection of the bumper interrupt (This interrupt is presented to the interrupt priority circuit 128), the processor sets all internal flags to indicate that the vehicle has stopped. An alarm command is also outputted from the third I/O port 122 to operate a tone generator 148, which may be a horn. This alarm command may vary at a fast rate under emergency stop conditions so as to indicate to the operator that the vehicle has shut down under an emergency stop. The alarm may be on at an intermediate rate to indicate that the vehicle is on the move at normal speed and at a slow rate to indicate that the unit is not moving. Essentially, simultaneously with the sounding of the alarm and the stopping of the vehicle, a real time clock counter is started in the processor 116 to provide a five-second period during which manual control may be assumed so that the operator may clear the obstruction from the bumper or attempt to move the vehicle in a manual mode away from the obstruction. If manual mode is selected by the manual controls 100, a bumper by-pass command is generated via the fourth I/O port 124 to release the brake mechanism 144. At the end of the five seconds, if the bumper switch is still activated, the cycle repeats. If the bumper switch is cleared, system will resume automatic guidance, when the vehicle is restarted by operator control. If the vehicle was placed in the manual mode to clear the obstruction, the wire must be reacquired.

The safety stop scanners also cause the brake mechanism to be operated, the vehicle to stop, the alarm to be sounded and an error message to be displayed on the display 104. When the vehicle has stopped, the processor 116 starts a real time clock for one second. At the end of the second, the safety stop interrupt is automatically reset. If the interrupt does not occur again, at the end of two seconds, the processor 116 will reinitiate vehicle operations which were ongoing before the safety stop interrupt occurred. If the vehicle is placed in a manual mode by the manual controls 100 after a safety stop, the brake will be released, but the processor will prevent the drive speed from exceeding a pre-determined fraction, say one-eighth of the maximum vehicle speed.

The third I/O port 122 also outputs turn signals to signal lamps mounted at the corners of the vehicle. These output signals, indicated as L-TURN and R-TURN, operate the lamp drive circuits. Both the left- and right-turn signal lamps may flash continuously at a slow rate (say 1 Hertz) when the vehicle is on the move. When a floor code is read to command the vehicle to turn right or left, the processor turns off the lamps on the corners of the vehicle opposite the direction of the turn to provide a turn signal indication.

The drive or traction motor speed is controlled by a drive speed digital signal which is converted into an analog signal by a digital-to-analog converter (DAC) 150. The analog signal is converted into a control current of magnitude representing the desired speed of the vehicle by a drive control amplifier 152. This amplifier provides a polarized output through the direction control 142 so that the direction of the current through the motor may be reversed by operating the contactors in the direction control 142. The drive speed varies automatically depending upon the mode of operation. As noted above, the processor limits the maximum speed under manual control. The speed is also limited when the safety slow interrupt is generated and when the vehicle is commanded to turn, execute special maneuvers or is under virtual guidance independent of the wire. Otherwise, maximum speed, for example 120 feet per minute is commanded by the drive speed signal from the fourth I/O port 124.

It is a feature of the invention to provide accurate and reliable guidance throughout the guidepath irrespective of perturbations of the output signals derived by the sensor coils from the wire either on a short-term or long-term basis. Short-term perturbations may be due to noise, electrical interference, the presence of pieces of magnetic material which might perturb the signal for short distances or other causes. Such perturbations are handled by the micro-processor in conjunction with the tachometer $T_S$ 36 or 72 output signals, TSINT, which enables the output signals from the inductive sensors, for example GUID A/F, GUID R, CAL, ACQF and ACQR to be monitored for changes occurring over pre-determined travelled distances, say a few inches. Signals of a transient nature caused by noise pulses, electro-magnetic interference, magnetic materials adjacent the guidepath and the like are automatically disregarded in the development of the steer-angle correction signals.

Accurate and reliable guidance while following the wire is also improved in accordance with a feature of the invention by not exclusively relying on output signals obtained by inductive sensors such as the coils which track the wire. Rather, the WAS signal from the wheel-angle sensor is used in conjunction with the signals from the sensor coils to provide the best fit guide path when travelling along the wire. In the case of the vehicle illustrated in FIG. 2 where two sets of coils are used, front and rear, the outputs from these coils and the wheel-angle sensor provide still more accurate guidance than with the FIG. 1 vehicle. Of course, as the vehicle length becomes longer, a slight variation in the angle of the vehicle at the front with respect to the rear is amplified by the length of the vehicle. Variations in these output signals are accommodated either by tailoring the amplitude of the analog signals or by digital control (calibrations) to accommodate differences in these guidance signals amplified by the length of the vehicle. Briefly, the output signals from the sensor coil such as GUID A/F and GUID R have an amplitude proportional to the offset or deviation from the wire. The difference between GUID A and GUID R also represents an offset from the wire. If this difference or if GUID A (in the case of the vehicle equipped as shown in FIG. 1) is outside of limits and the vehicle is travelling a straight line as determined by the wheel-angle sensor, the processor responds with a steer-angle correction output which is outputted from the third I/O port 122 to the steering motor 24 or 56 via the DAC 138, sum amplifier 140 and servo amplifier 136. This correction realigns the vehicle to produce the best fit of the vehicle along the path defined by the guide wire. It will be noted that when a vehicle is equipped with front and rear sensors as shown in FIG. 2, during following the wire around a turn, only the array of coils in the front of the vehicle, and the GUID F signal, is used with the wheel-angle sensor in order to derive any necessary steer-angle correction signal. If the vehicle is driven in the reverse direction, the array of sensors at the rear of the vehicle is used for guidance around turns. Inasmuch as the sensor coil array rotates with the steering wheel 14 in the vehicle shown in FIG. 1, that vehicle is guided around turns only when travelling in the forward direction. Presently preferred embodiments of the analog circuits 95 which process the outputs of the wheel-angle sensors 30 or 70 and the arrays of sensing coils and their pre-amplifiers 90, 92 and 94 will be more apparent from FIGS. 4 and 5.

In FIG. 4, the sensor coils and their preamplifiers 160, 162, 164 and 166 are shown on the drawing. It will be appreciated that these coils and preamplifiers are part of the wire sensing coils and preamplifiers A shown at 90 in FIG. 3(a), the Code reading coils $V_{cr1}$ are connected in bucking relationship to the preamplifier 166 so as to make these coils unresponsive to the field around the wire except when the wire runs transversely to the direction of travel as is the case for the floor code patterns. The wheel angle position sensor 30 is shown as a potentiometer 168, across which a reference voltage $V_{wr}$ is applied. The movable arm of the potentiometer is on center when the steering wheel is along the end-to-end center line of the vehicle. Then a voltage obtained from the center arm and inverted in an inverting amplifier 170 is one-half $V_{wr}$, when the steering wheel is straight ahead. The inverting amplifier output is the wheel angle sensor output WAS. The magnitude of WAS equals a reference voltage $V_{OSREF}$ which is one-half $V_{wr}$ when the steering wheel is straight ahead on the vehicle center line. This voltage is converted into a digital number which in the case of the 12-bit ADC 134 shown in FIG. 6 corresponds to decimal 2048, when the vehicle is straight ahead. The WAS signal increases and decreases in amplitude with respect to $V_{OSREF}$ when the steering wheel turns. WAS is then converted into a digital signal having a decimal value which increases and decreases with respect to 2048 to represent the direction and amounts of angular variation of the steering wheel with respect to the center line of the vehicle. As the description proceeds it will become apparent that the guidance signals, such as GUID A, are also represented by digital numbers which represent 2048 when the vehicle center line is aligned with the wire as indicated by the sensing coils or is on the wire.

In the analog circuits 98, the signals from the left and right horizontal coils $L_h$ and $R_h$, which are used for guidance and acquisition, are obtained from their preamplifiers 160 and 164 and applied to switched tunable filters 172 and 174. The frequency select command switches in and out appropriate tuned circuits so as to select either the $f_1$ or $f_2$ signal as dictated by the floor code or differing acquisitions by first selecting $f_1$ if it is present in the portion of the guide path on which the vehicle is located and, if not, then selecting $f_2$. The output of these switched tunable filters 172 and 174 is applied to rectifier and integrator circuits 176 and 178 from which are provided direct current signals corresponding to the amplitude of the signals from the wire sensed by the $L_h$ and $R_h$ coils. These direct current signals are applied in opposite polarity to a summer circuit 180. The summer circuit may be an operational amplifier. The outputs of the rectifier and integrated circuits 176 and 178 are applied in opposite polarity to the summer 180 so that a differential output is obtained corresponding to the difference in amplitude of the signals detected by the horizontal coils, $L_h$ and $R_h$. This differential signal provides the GUID A guidance signal.

The ON WIRE signal is obtained also from the outputs of the rectifier and integrator circuits 176 and 178 by comparators 182 and 184. The outputs of these comparators are applied to a gate 186 which performs an AND function. When the signals sensed by the $L_h$ and $R_h$ coils are equal or greater than $V_{REF}$, corresponding to both of these coils being within a given distance from the wire (the 4" distance noted above, for example), the ON WIRE output level appears at the output of the gate 186.

In order to determine whether the frequency selected is present on the portion of the guide wire over which the vehicle is located, the outputs from the left and right horizontal coils, as taken from their preamplifiers 160 and 164, is applied to another summer circuit 188. Another switched tunable filter 190 is operative to pass the sensed signal if it is of the frequency which is selected. A rectifier and integrator circuit 192 detects the signal from the filter 190. A comparator 194 provides the FREQ PRESENT output when the signal from the wire is of the selected frequency and is of sufficient amplitude to provide assurance that it is sensed from the wire (for example the wire is within 4" of either of the sensing coils $L_h$ and $R_h$). Thus, either if the wire is not energized due to a break in the wire or a failure of the signal generator which applies the $f_1$ or $f_2$ frequency thereto, or if the wire does not carry the frequency which is selected, the FREQ PRESENT output so indicates.

The (CODE) signal and the (CAL) signal utilize the same demodulation circuitry, which functions as a chopper synchronous demodulator using the signals from the horizontal coils $L_h$ and $R_h$ as one input and the signals either from the vertical coil $V_{rc}$ or the CODE reading coils $V_{cr1}$, $V_{cr2}$ as the other inputs. When the calibration mode is being performed, the CAL SELECT control line is high which enables a gate 196 to pass the signal from the $V_{rc}$ coil preamplifier 162 to a switched tunable filter 198. By means of an inverter 200 and another gate 202, the signals from the code reading coil preamplifier 166 are inhibited. Reference signals for operating an analog chopper switch circuit 204 are obtained by capacitively coupling the signals from the switched tunable filters 172 and 174 to clipper circuits 206 and 208. The clipped signals are summed in a summer 210 where they are added in phase and amplified in amplifier 212. FIG. 4a, waveform (a) shows the signals from the $L_h$ and $R_h$ coils at the output of the switched filters 172 and 174. The output of the drive amplifier 212 is a square wave signal at the same frequency, $f_1$ or $f_2$, and closes the switch in the chopper circuit 204 during each positive half cycle. The output from the switched tunable filter 198, which carries the signals from the calibrating verticle coil $V_{rc}$ or the code reading coils, is capacitively coupled through the chopper switch 204 to an integrator 214. The nature of these signals is shown in FIG. 4a, waveform (c). It will be apparent that there are many cycles of the reference signal, which is at frequency $f_1$ or $f_2$, even between each bit of the digital signal which is derived from a floor code pattern. A typical pattern is shown in FIG. 4 at 216. Accordingly and for example in the calibrating mode, if the calibration coil is directly over the wire, there is no input nor any output from the chopper switch (zero volts occurs) shown in waveforms (c) and (d) in FIG. 4a. The output of the integrator 214, as shown in waveform (e), is also zero volts. However, if the wire is for example slightly to the left of the vertical coil, an output signal as indicated by the solid sine wave shown in waveform (c) of FIG. 4a is chopped by the chopper switch 204. Upon integration, after the first few cycles of the reference signal, a DC level as indicated by the solid line in waveform (e) of FIG. 4(a) results. If the wire is to the left, the phase of the signal detected by the verticle coil $V_{rh}$ reverses. Accordingly, a chopped output indicated by the dotted curve in waveform (d) of FIG. 4(a), when integrated, produces a DC level, after the first few cycles of the $f_1$ signal as indicated by the dotted curve in wave form (e) in FIG. 4(a). The time scale of the FIG. 4(a) is much larger than the time scale of the code signal shown at 218 in FIG. 4. Nevertheless, the output is obtained in a similar way and follows the transitions in the wire. The CAL signal is obtained from a summer circuit 220 to which the offset reference voltage $V_{OS-REF}$ is applied, such that when the integrated output signal is zero volts the CAL output will be equal to $V_{OSREF}$, a voltage which is converted in the ADC 134 (see FIG. 6) into a digital signal corresponding to 2048, decimal.

Referring to FIG. 5, there is shown the analog circuits 95 when configured for use with a vehicle having sensor arrays at the front and rear ends, exemplified in FIG. 2. In FIG. 5, the inputs from the front wire sensing coils and preamplifiers (F), shown at 92 in FIG. 3(a), are connected to one set of analog circuits 222 while the inputs from the other set of wire sensing coils and preamplifiers R, shown at 94, in FIG. 3(a), is applied to another set 224 of the analog circuits. The analog circuits in the set 222 are for the forward end sensor arrays while the analog circuits 224 are for the rear end sensor arrays. Both sets of analog circuits 222 and 224 are similar and only the set 222 for the front end array is shown in detail. The wheel angle sensor WAS output passes through the analog circuits 95 and may be generated from the potentiometer 168, with an inverting amplifier 170 as was explained in connection with FIG. 4.

The ON WIRE and FREQ PRESENT outputs are obtained from the horizontal acquisition coils, $L_{hf}$ and $R_{hf}$, and the horizontal guidance coil $H_{gf}$. These outputs are applied to a summer circuit 226 where they are all summed in phase. A switched tunable filter 228, controlled by the FREQ SELECT control signal, provides an output when any of these coils are inductively coupled to the guide wire. This output is rectified and integrated in a rectifying and integrating circuit 230 and triggers a Schmidt trigger circuit 232 when the amplitude of the rectified and integrated signal is equal or greater than $V_{REF}$. The Schmidt trigger will remain triggered when in one state, say high, so long as there is sufficient output from the horizontal coils to indicate that the vehicle is on the wire. A similar circuit is contained in the analog circuits for the rear end sensor array 224. These rear end circuits will also provide an output if the rear end of the vehicle is on the wire. A gate 234, which performs an AND function, provides the ON WIRE signal to an optical isolator 236 where both ends of the vehicle are sufficiently close to the wire such that the wire radiated signals are useful for guidance. Inasmuch as the switched tunable filter 228 is in the circuit, the ON WIRE output also serves as a FREQ PRESENT.

The guidance signals during acquisition and in the wire guided modes of operation of the system and the code and calibration signals are all derived by synchronous demodulation using the horizontal coils to provide reference signals. The in-phase summed outputs from the summer 226, after filtering in the filter 228, operate a chopper drive circuit 238 containing clippers and amplifiers to provide a square wave drive signal to chopper demodulators 240 and 242. These demodulators are chopper and integrating circuits like those having the chopper switch 204 and integrator 214, as described in connection with FIG. 4.

Either acquisition or code signals are obtained sharing the same chopper demodulator 240. A differential signal from the acquisition coils $L_{hf}$ and $R_{hf}$ are obtained by an inverter 244 and summer circuit 246. Gates 248 and 250, which may be analog switches, are respectively enabled and inhibited by the ACQ/CODE SELECT command, with the aid of an inverter 252. The selected sum signal from the acquisition coils or the code signal from the code reading coils is passed through a switched tunable filter 254 to the chopper demodulator 240. When the acquisition signal is selected, a summer circuit 256 comes into play. The offset reference voltage is applied to this summer circuit so that the ACQ F output varies in accordance with the magnitude of the differential signal from the summer 246. The ACQ R signal is also obtained when the ACQ/CODE SELECT command is used, namely during the acquisition mode.

When the code reading coils are selected, the chopper demodulator 240 applies its output to another gate 258, which may be an analog switch. Depending upon the direction of travel of the vehicle, FWD/REAR CODE SELECT command enables the gate 258 when the vehicle is traveling forward so that the CODE output is provided from the forward code reading coils $V_{crf1}$ and $V_{crf2}$. The CODE signal is derived from the rear code reading coils $V_{crr1}$ and $V_{crr2}$, when the vehicle is traveling in the reverse direction.

For guidance in close proximity to the vehicle, the center vertical coils $V_{rf}$ and $V_{rr}$ are used. These outputs are applied to another switched tunable filter 260, and then to the chopper demodulator 242. A summer circuit 262, to which the offset reference voltage is applied, produces the guidance signal GUID F. A similar circuit produces the GUID R signal. Other analog switch gates 264 and 266, operated by the FWD/REAR CODE SELECT command, select either the GUID F or the GUID R guidance signal as the CAL signal. The operation of the chopper demodulators 240 and 242 will be apparent from the description presented in connection with FIGS. 4 and 4a.

Consider next the reading of floor codes. A typical floor code is shown in FIG. 8, curve (a). The code pattern has twelve spaces or cells. The first two of these are identified as the pre code interrupt (PCI) and the pre code acknowledge (PCIACK). There follows ten additional cells. These twelve cells represent twelve bits of a digital signal. In order to give assurance that a floor pattern, and not a perturbation in the CODE signal as might be caused by swinging or deviation of the vehicle so that the code reading coils cross the wire, the PCI and PCIACK cells always carry bits corresponding to a binary one followed by a binary zero. A binary one is represented as a transition to the right in the pattern, (i.e., the wire is layed out transverse to the path from left to right looking in the direction of travel of the vehicle). In the frame of reference shown in FIG. 8, this is an upward transition. Each bit cell is allotted two inches in the pattern. The code reader accommodates variations in this distance as may occur when the patterns are laid out on the floor. Since the code reading is synchronous and resynchronized by each transition, cumulative errors in the transitions are ineffective to produce erroneous reading of the floor code.

After the PCI and PCIACK bits, there are three groups of bits. The first group, consisting of bits 1 and 2, is the code-defining subgroup. The next subgroup, indicated as subgroup A in FIG. 8 consists of four bits 3–6. When the floor code represents routing information, this group indicates the zone of the guide path in which the floor code is located. The last subgroup made up of bits 7–10 defines the spur in routing. The code-defining group provides the information characterizing the code as being an address code which directs the vehicle to a spur, an intersection code which determines whether the vehicle will travel a wire-guided turn mode either on the $f_1$ or $f_2$ wire depending upon its address, and special codes for controlling virtual guidance modes, stop modes, backup and reverse modes, the calibrate mode, holds in place, sensor selection and other functions. Over 1,000 different operating modes and functions can be commanded by means of the floor codes. Portions of the codes can also be used to force or select different guidance modes by controlling the FREQ SELECT command so that the vehicle may switch from the $f_2$ wire to the $f_1$ wire upon leaving a spur. Additional partial codes may also be used to command an accurate stop, if a special code to slow the vehicle is first used followed by a partial code to command a stop. As a practical matter, therefore, an almost unlimited number of codes are available to select various operating modes and functions.

The system services the floor codes and enables the floor code reader 114, which is shown in greater detail in FIG. 7, to read the code and output the code data onto the data lines via the third I/O port 122. In order to provide further assurance that a proper code is received, the system should be in the automated, wire guidance mode and to have acquired the wire (the ON WIRE being present) for at least one foot of travel in advance of the PCI transition. The vehicle must, of course, be moving. The detection of the PCI causes the system to operate in the virtual guidance mode during code reading for a distance of 30 inches from the PCI occurrence in this example where there are twelve cells in the pattern, each two inches long.

The code signal ("CODE") from the analog circuits 98 (FIG. 3(a)) or 95 (FIG. 5)) is applied to a comparator 270 which has two comparator circuits for detecting transitions to the right and transitions to the left. A transition to the right triggers a one shot 271 to provide an affirmative output (a high level pulse, for example, on its Q output) while a transition to the left will provide an affirmative not Q output. A PCI transition then sets a PCI latch 272. When the Q output of the latch 272 is affirmative (high in this example), the latch generates the PCI interrupt which is shown as PCI at the output of the code reader 114 (FIG. 3(a)) and at an input to the interrupt priority circuit 128 (FIG. 3(b)). When the CPU 116 reacts to this interrupt, it generates a PCI received output on a control line to the code reader which resets the PCI latch, another latch 274, called the PCI acknowledge latch and a shift register 276 which stores and outputs the digital signal represented by the floor code.

The code reader 114 also responds to the tachometer $T_s$ pulses, TSINT. These pulses are applied as clock pulses to counter control logic 278. The microprocesser 116 also tests the PCI acknowledge latch 274, after a guidance system counter using RAM memory space in the memory 126 (FIG. 3(a)) has accumulated TSINT counts corresponding to 1.4 inches after the PCI interrupt occurs. This testing is done every 2/10 inch of travel of the vehicle for a maximum of 2.8 inches. If the PCIACK (the Q output of the PCI acknowledge latch 274 going high) does not occur, the system responds by assuming that the PCI interrupt was false and resets the PCI latch 272. When the acknowledge latch 274 is set and the system is guiding on $f_2$, a command is issued to select $f_1$ for guidance and reset the PCI latch 272 and the PCI acknowledge latch 274. $f_1$ is then selected and the code is read from the $f_1$ signal on the wire. If the system is not guiding on $f_2$ or if $f_1$ is not present, the system looks up the previous code which was read to determine if it is conditioned to respond to a special function code, such as an accurate stop and code reading is discontinued. However, if PCI and PCIACK output appear at the Q outputs of the latches within 2.8 inches of travel, a proper code is assumed ready to be read. The microprocesser 116 then resets the distance counter in memory 126 to provide virtual guidance steering for 30 inches from the PCI transition and provides the TSINT as a clock to the counter control logic 278.

For a proper floor code, a PCIACK output appears within 20 counts and the system relinquishes control to the code reader 114, and will not interfere with code readings unless a valid code interrupt (VALID CODE) has not been received after 150 counts. If no valid code interrupt has then been received, an invalid code indication is displayed on the display 104 and the vehicle continues to travel in the wire guidance mode. Whatever code has then been stored in the shift register 276 is disregarded.

When the PCI occurs, an enable output (EN) from the not Q output of the PCI latch 272 enables the counter control latches 278 to begin counting. The shift register is reset as noted above. The counter control logic 278 gates the TSINT pulses to the clock input of a divide by twenty counter 280. The PCI transition from the Q output of the one shot 278 is propagated through the counter control logic 278 to preset the divide by twenty counter 280 to ten. On the tenth gated TSINT pulse, a clock pulse is applied to the shift register 276.

The PCI transition has also set another latch 282 which stores the PCI bit so that it is available to be read into the shift register 276 upon occurrence of the clock pulse from the counter 280. Unless another transition appears, either a transition to the right or a transition to the left, the counter control logic does not apply a preset and the counter 280 will count to twenty before applying a clock pulse to shift in data into the shift register 276 via the latch 282.

Referring to FIG. 8, curves (b) and (c), it will be seen that there are either ten or twenty TSINT's between clock pulses to the shift register. Accordingly the data will be read essentially in the center of a cell, thereby accomodating for variations in cell spacing due to tolerances in the construction of the pattern providing the floor code.

When the twelfth clock pulse occurs, the PCI bit is in the last stage of the shift register 276. This bit is always a binary one. Accordingly, when a binary one appears in the last stage of the shift register it is taken as a valid code interrupt. The counter control logic is inhibited and the data is available for read out on the ten bit data bus from the shift register to the I/O port 122. This data is transferred to the microprocesser 116 over the data bus and the appropriate operation is performed. When VALID CODE is received, a control signal is outputted from the third I/O port 122 and resets the PCI latch 272, which is now ready for a new PCI transition.

It is not necessary that all of the floor codes in an installation be stored in memory. This is advantageous in that the programming need not be application specific. These intersection codes and the zones to which the vehicle is addressed are used to place the vehicle selectively in the wire guided turn modes.

There are address codes indicated in FIG. 10 as $A_1$, $A_2$, etc. on the main wire at intersections to spurs. These address floor codes have a code defining group which in this example may be 00. If $f_2$ is not present, this code is used for a stop on the main or $f_1$ wire. If the address from the $A_1$, $A_2$, ... etc. floor codes is coincident with an address to which the vehicle is routed the vehicle is commanded to switch to $f_2$ and is guided into a spur, unless traffic control indicates that the spur is occupied, as discussed above. If $f_2$ is not present when an $A_1$, $A_2$, etc. floor code is read, the vehicle will stop. The values of the various address codes, $A_1$ through $A_8$ are shown in FIG. 10.

The B codes are stop codes and are preceded by the code definition group made up of a pair of binary one bits. $B_1$, $B_2$, $B_4$ and $B_6$ are for an immediate stop while $B_3$ is for an accurate stop. When $B_3$ is read the vehicle slows down to creep speed and stops at the next transition which occurs when the $C_3$ floor code is read. $C_3$ may be a partial code consisting of a PCI and PCI acknowledge. The other C codes are similarly two bits consisting of a PCI and PCI acknowledge. The system, where $f_2$ has been selected and these C floor codes occur, is forced to switch from $f_2$ to $f_1$ so as to assume the $f_1$ wire guidance mode.

The D codes are intersection codes designated by "01" or "10" code definition bits. The value of the code subgroups A and B (see FIG. 8) which make up the D intersection codes and the zone to which the vehicle is routed determine whether the vehicle will switch from the $f_1$ or main wire to the $f_2$ wire so as to execute a turn under $f_2$ wire guidance. If the code designator is "01" for an intersection code and the A and B subgroups are equal in numerical value and to the zone to which the vehicle is programmed the vehicle is switched to the $f_2$ wire. If the A subgroup is smaller in numerical value than the B subgroup and the zone to which the vehicle is programmed is a zone having a number equal to the numerical value of subgroup A through the numerical value of subgroup B, the vehicle will also switch to $f_2$ guidance. If the numerical value of the A subgroup of the intersection code defined by the "01" definition bits is greater than the numerical value of the B subgroup, for all zones to which the vehicle is routed between zone having numbers equal to the numerical values of subgroups A and B, the vehicle is switched to guidance on $f_2$. Where the code definition group of the D intersection floor code is "10" the vehicle will switch to guidance on $f_2$ only if the numerical value of the A subgroup is less than the numerical value of the B subgroup, and the vehicle is routed to a zone having a number equal to the value of the A or the value of the B subgroups. If the A subgroup is greater than the B subgroup in numerical value, the vehicle will switch to guidance on the $f_2$ wire only if it is routed to a zone which is not zone 2 nor zone 8. In the system illustrated in FIG. 10 there are sixteen possible zones and sixteen possible spurs. Of course, if fewer spurs and zones are needed in the system, the code may have fewer bits in their subgroups, and if more spurs and zones are needed in the guide path additional bits may be provided in the subgroups.

The special codes E, F and G are designated by "11" definition bits and provide a programmed maneuver in the case of floor code $E_1$, virtual guidance straight ahead for six feet in the case of floor code $F_1$, and the calibrate mode in the case of $G_1$.

Consider a routing example using the guide path floor codes indicated in FIG. 10. A sequence of seven addresses or stops defines in route. These may be as follows: First stop at zone 1, spur 1; Second stop at zone 2, spur 5; Third stop at zone 3, spur 1; Fourth stop at zone 3, spur 3; Fifth stop at zone 1, spur 3; and Last stop at zone 1, spur 4. The vehicle is initially in the holding spur which is spur 4. The vehicle enters the main guide path and first reads code $A_1$. $A_1$ is coincident with the first address as will be apparent from the binary value of the code adjacent to the $A_1$ block being equal to decimal one for subgroups A and B. The system then switches to guidance on $f_2$ and the vehicle is shunted onto spur 1. Floor code $B_1$ is next read and an immediate stop is performed. The vehicle remains stopped until a start command is received. For example, the operator on spur 1, after removing the portion of the load carried by the vehicle in which the operator is interested, presses the start button and vehicle proceeds along the path. The vehicle will continue on to floor code $C_1$ where it reads the PCI and PCI acknowledge transition. Since the vehicle is guiding on $f_2$, it automatically switches to guidance on $f_1$ and continues along the main guide path.

The floor code A is next read. The second address to which the vehicle is routed does not match the $A_2$ floor code. Therefore, the vehicle continues on the main guide path without taking any action. Next the $A_3$ floor code is read, and the vehicle switches to guidance on $f_2$ because a match to the second address has occurred. The vehicle is shunted onto spur 5. The $B_3$ floor code is read which causes the vehicle to slow down and look for PCI and PCI acknowledge transitions. Upon reading $C_3$, which is the PCI and PCI A acknowledge floor code, the vehicle stops. The vehicle remains stopped until it is restarted by the operator at spur 5. The vehicle then continues on spur 5 until the $C_4$ code is read and then switches back to guidance on $f_1$ and follows the main guide path.

The intersection floor code $D_1$ is then read and the decision is made as to whether or not to execute a turn under $f_2$ guidance. Following the program, the computations mentioned above occur. If the next address on the routing is a zone 1 or zone 2 address, the vehicle would switch guidance on $f_2$ and turn until the $C_5$ floor code is encountered. However, the next address in the routing is to zone 3. Therefore, the vehicle remains in the $f_1$ guidance mode and optimizes its path (takes the shortest path to the next address).

Floor code $A_4$ is then encountered and a match occurs with the next address in the routing. Therefore, the vehicle switches to guidance on $f_2$ and is shunted onto the spur. The $B_4$ floor code causes the vehicle to execute an immediate stop. When the vehicle is commanded to start again, floor code $C_6$ causes it to switch from guidance on $f_2$ back to guidance on $f_1$ and reacquire the main guide path.

Floor code $D_2$ is then read and another routing decision is made. The vehicle would switch to guidance on $f_2$ if zone 1 or zone 2 was part of the next address. Since the next address is 3, 2 in decimal value, the vehicle will continue until 3, 2 is encountered and switch to $f_2$ at floor code $A_5$. Floor code $B_5$ causes a stop and hold which is timed for five minutes because of the special $B_5$ floor code. After five minutes, the vehicle automatically starts up again. Floor code $C_8$ causes the vehicle to switch back to guidance on $f_1$, and the vehicle continues along the main guide path.

Floor code $A_6$ is then read. Since the vehicle address for the next stop in the routing matches the $A_6$ floor code, the vehicle switches to $f_2$ guidance and is shunted to the spur. When floor code $B_6$ is read, the vehicle stops immediately until it is restarted manually. On further travel along the spur, the $C_9$ code is encountered and the vehicle switches back to guidance on $f_1$.

Floor code $A_7$ is then read. Since that floor code and the next address in the routing match, the vehicle switches guidance on $f_2$ and is shunted onto the spur. Floor code $E_1$ is then encountered which causes the vehicle to perform a programmed maneuver into the loading dock. The programmed maneuver can be preprogrammed into memory or the maneuver can be learned under manual operator control. The learning capability of the system will become more apparent from the flow chart which depicts the learning program in FIG. 9(e). After the maneuver is completed, the vehicle stops at the loading dock and remains there until manually started. The maneuver is then repeated in reverse until guidance on $f_2$ is reacquired at the point the vehicle left the spur. Floor code $C_{10}$ is then encountered and the vehicle switches to guidance on $f_1$ and reacquires the main guide path. It will be seen that the programmed maneuver, independent of the wire, enables the vehicle to be guided near an object such as a loading dock which may be constructed above the floor or from magnetic material so as to render wire guidance impracticable.

When the calibrate floor code $G_1$ is encountered, the vehicle guides on the CAL output and the guidance control is automatically recalibrated. For example, the vehicle may have been calibrated so that a guidance signal equal to 2048 means that the steering wheel is straight. After a period of usage during which mechanical misalignment may occur or aging of components occurs, the value of the sensor output, when digitized, which corresponds to the steering wheel being along the center line may no longer be 2048 but some other value, say 2108. Upon recalibration 2108 is taken as the straight ahead or on center line value for computing steering corrections.

Continuing along the guide path after calibration, the $A_8$ floor code is read. Since a match with the last address on the route has occurred the vehicle is shunted onto the holding spur until floor code $B_7$ is encountered. The vehicle then stops and remains on the holding spur until a new route is entered by way of the key board 102 (FIG. 3(b)).

The program under which the CPU 116 operates in conjunction with the sensors and other components of the system shown in FIG. 3 will be more clearly understood from the flow charts contained in FIG. 9, which is presented in four pages as FIGS. 9(a)(1) and 9(a)(2), (b), (c), (d) and (e). The program is stored in the memory 126 of the system shown in FIG. 3(a) in the ROM of that memory. The assembly language source code of the program suitable for use with the Intel chips which may be used in accordance with the presently preferred embodiment of the invention will be apparent to one skilled in the art from the flow chart.

Upon start-up of the system (See. FIG. 9(a)(1)) the system is initialized by applying resets to the keyboard display control (106 FIG. 3)(b), the timer circuits 130, the interrupt priority circuit 128 and the I/O ports. The manual operating mode is selected on startup. The wheel angle sensors signal (WAS) and the manual guidance signal (STEER M) read. If a steering correction is ordered, the steering is corrected; the object being to guide the vehicle so that it acquires the wire. The manual speed control potentiometer is also read and the SPEED M signal is used to correct the speed to a maximum which is one-eighth normal speed. Then the signals derived from the sensor coils (the GUID signals) are read. When the sensor coils are in range of the wire as determined by the GUID A or GUID F signals being of a cognizable amplitude, the system will continue to guide automatically, and if it is equipped with the outboard sensor coils $L_{hf}$ and $R_{hf}$ and produces an ACQ F output, until the ACQ F output is approximately equal to zero. If the vehicle is equipped only as shown in FIG. 1, the presence of a cognizable GUID A signal is taken to indicate that the vehicle is located with its sensor coils in range of the wire. It is only when the vehicle is equipped as shown in FIG. 2 that a period of automatic guidance occurs to provide further assurance that the vehicle has acquired the wire.

Then a test is made to determine if the vehicle is over a portion of the path in which the wire carries an $f_1$ or an $f_2$ signal. The selection of $f_1$ with the ON WIRE signal present or the selection of $f_2$ with the ON WIRE signal present are tested. If either $f_1$ or $f_2$ is selected, and there is an ON WIRE output, the automatic guidance mode follows. If $f_1$ is selected the vehicle is made ready to guide on $f_1$. The system switches to automatic and stops. IF ON WIRE is not present, the manual mode is reiterated until the wire is found for the selected frequency, and ON WIRE is detected. For the vehicles fitted with two sets of sensor coils the vehicle switches for wire guidance by selecting the GUID F and GUID R signals.

After these acquisition operations are completed the system returns to the main loop, which is indicated in FIG. 9(a)(1) by the connectors A which are shown in closed circles. It will be apparent that the system must next proceed in a wire guidance mode and cannot jump to a virtual guidance mode unless there has been a distance over which the vehicle is guided along the wire so that it may line up with the wire as an initial guidance operation. With wire guidance selected and the horizontal coils $L_h$ and $R_h$ or the inner coils $V_{rf}$ and $V_{rr}$ over the wire, the GUID A or the GUID F and R signals derived from these coils are read. Also, the WAS is read. See FIG. 9(a)(2). In order to assure that noise or other perturbations are discriminated against in deriving steering correction signals, the difference between fifteen successive GUID signals taken one-tenth inch apart, as the vehicle travels along the wire and as indicated by the TSINT pulses from the steering wheel tachometer (36 or 72, shown in FIGS. 1 or 2 and 3(a)), is accumulated. If the difference between these fifteen signals is within a limit, the guidance error is not due to a deviation of the vehicle from the guidewire, but rather may be noise or a perturbation. It is only if this difference between fifteen successive guidance signals is not within the limit that a correction in steering is processed. The correction is processed for each guidance signal under control of the timers (130, FIG. 3). Thus, upon each successive increment of time the correction is computed.

In order to maintain the digital signal positive, and either greater than or less than 2048 which corresponds to the center location of the vehicle, the WAS value is either added to the difference between the GUID signal and 2048 divided by 5 or subtracted from 2048 minus the GUID value divided by 5. The steering correction signal is then applied to the DAC 138 to control the steering motor.

In the event that the speed correction is required, as may be determined by the safety signal generator 96 outputs, or floor codes in the event of guiding around turns, a speed correction signal is developed and applied to the DAC 150 for controlling the drive motor 32 (FIG. 1 or (64) FIG. 2). Upon each steering and speed correction which occurs under timer control, the ON WIRE signal is checked so as to assure that the vehicle is still on the wire. If the ON WIRE signal is not present, a brake command is generated and the vehicle stops. A fault indication also appears on the display 104. After time outs to clear the off-wire fault, as explained above in connection with the bumper by-pass control using the gate 146, the vehicle may be restarted and proceeds along the wire. A floor code is encountered after a travel distance during which the wire guidance mode is in effect. A PCI and PCI ACQ bit must be read while the vehicle is travelling a short distance as explained above in the description of the code reader shown in FIG. 4. If a floor code virtual guidance command has already been stored in the register, which is the case when an accurate stop floor code is anticipated, the system switches to virtual guidance. As shown by the connectors indicated by the letter B in a circle in both FIGS. 9(a)(1) and 9(a)(2), the system loops back to where the condition of the system for wire guidance is checked.

Inasmuch as the system has switched to virtual guidance, it proceeds to read the full floor code, as shown in FIG. 9(b). During floor code reading virtual guidance is carried out for a fixed distance of 30 inches as explained in connection with the code reader (FIG. 4). A virtual guidance command may, however, be commanded by a floor code to enable the vehicle to be guided independently of the wire. In the event that the vehicle is not equipped with the rear wheel tachometers $T_L$ and $T_R$ 40 and 42 (FIG. 1) or 86 and 88 (FIG. 2), virtual guidance is under the control of the wheel angle sensor. WAS is read and steering corrections as may be required to maintain the vehicle travelling straight ahead are processed. The TSINT pulses from the steering wheel tachometer are read and counted until the virtual guidance distance has been travelled. Until the requisite count is reached, the system returns to the main loop and continues to correct the steering under WAS control at successive increments of time upon occurrence of the TMINT interrupt from the timer circuits 130. When the virtual guidance distance count is reached, the system switches back to wire guidance, either on the $f_1$ or $f_2$ wire as previously selected during the wire guiding mode. The reduced speed operation which occurs on switching to virtual guidance (See FIG. 9(a)(2)) is terminated and the speed flag is set so that the drive motor control signal enables resumption of normal speed. The system returns via the connectors B to the automatic mode for wire guidance or for other guidance modes.

In the event that the vehicle is equipped with the rear wheel tachometers, the TRINT and TLINT interrupts therefrom are read as the vehicle travels certain preset distances which may be obtained from the TSINT interrupts or the TMINT interrupts. The TRINT and TLINT interrupts are counted and if their count is equal, it may be certain that the vehicle is guiding straight ahead in the same direction as it was travelling under wire guidance. If the counts differ, the difference is used to correct the steering either by commanding a right or left turn. The virtual guidance mode under rear wheel tachometer control continues until the virtual guidance distance has been travelled.

In the event that a floor code for virtual guidance is not read, the system checks for a floor code representing the calibrate mode. The program for carrying out the calibrate mode is shown in FIG. 9(c). During calibrate mode the CAL output is read and steering corrections are determined by the amplitude of this output. During calibrate mode the vehicle must be on the move. If it is not, the system returns to the main loop via the connectors shown by the letter A in the circle. New values for WAS and the GUID signals are then read. Fifteen readings are taken and averages over the fifteen readings are computed. If the averages are within a limit, for example, less than a decimal value of 20 from the previously stored limits, the new values are disregarded. Otherwise the average values of WAS and GUID or GUID F and R are stored as the new center values. These values are then used in steering correction. In the case of the GUID signals, the values used in computing steering corrections are offset so that they reflect the values for true on-wire guidance signals. After the calibration mode, which occurs over a given distance, say three feet along the wire, and a distance count of TSINT signals so indicates, the system is switched back to wire guidance and reset to normal speed. The system then returns to the main loop shown by the connectors A in the circle.

Referring next to FIG. 9(d), the program which comes into play when a programmed turn is selected, as indicated by a floor code, is shown. The wheel angle sensor output WAS is read and the distance travelled from the start of the programmed turn is obtained by counting the TSINT pulses from the steering wheel tachometer $T_S$. The count is held in a distance travelled counter in RAM. This counter is read to determine the distance travelled represented by the output DTC from the distance travelled counter. The pulses from the rear wheel tachometers $T_R$ and $T_L$, TRINT and TLINT are also read and counts of the TRINT and TLINT pulses are accumulated for each successive foot of travel along the programmed turn. During the programmed turn, the vehicle is travelling at reduced speed. The WAS, TRINT and TLINT counts for the turn are stored in a table in RAM. This table may be established in a learning mode of the system as will be described in connection with FIG. 9(e) or may be inputted manually from the keyboard. For successive travel distances, as indicated by the DTC output, different values of WAS and the TRINT and TLINT counts are fetched from the table.

If the TRINT and TLINT counts equal the table values and the WAS output also equals the table value, no steering corrections are made and the program loops back through the connectors, indicated by the letter B, until the end of the turn is indicated by the DTC output. Of course, if the end of the turn is reached, the system switches to wire guidance, resets to normal speed and returns to the main loop via the connectors A.

If the TRINT and TLINT counts equal the table values but the WAS output does not, the steering is corrected in accordance with the difference in WAS values (actual versus table) and the steering is corrected so as to force the vehicle in a direction for WAS to equal the table value. Again the program loops back until the end of the turn is reached. If neither the TRINT and TLINT counts nor the WAS output equal their table values, the steering is corrected for WAS to equal the table value and the corrections continue iteratively again until the end of the turn is reached.

Under the final circumstance where the TRINT and TLINT counts do not equal the table value, but WAS does equal the table value, both TRINT and TLINT are used to correct the steering either to increase or decrease the counts of TRINT and TLINT to equal their table values. The use of the TRINT or TLINT counts is inhibited except at the precise distances for which these values appear in the table as indicated by the DTC count. Accordingly, very precise control is obtained when steering under virtual guidance around a programmed turn. Of course, other maneuvers than turns may be programmed in a similar manner as described for the programmed turn in connection with FIG. 9(d).

Referring to FIG. 9(e), there is shown a program for establishing a table and thereby teaching the system to execute a programmed turn or other programmed maneuver. This program is obtained by entering a command to start the learned program turn as a special function from the keyboard. The manual mode must be selected when this special function is entered. If it is not an error message is displayed and the system returns to the main loop via the connectors A. A reduced speed is set in during the learning operation from the manual controller. The vehicle must be on the move during a program turn. If not, the keyboard is scanned to determine if the end key has been pushed to signify the end of the programmed turn distance. If the end key has been pushed, the vehicle stops and is reset to normal speed. The system operation then returns to the main loop via the connectors A.

If the vehicle is on the move, an initilization process for the first point (point zero), the distance for the first point in the turn, which may be one foot, is set and a reading for the DTC count is inputted into the memory in the point zero location. In this example there are 64 points maximum or 512 bytes of data in RAM allocated to a learned programmed turn. At this point zero location, readings from the wheel angle sensor WAS, the TRINT count or right turns count (RTC) are stored. Also stored in this first location in the table are the TLINT or left turns count (LTC). The distance for the next reading, one foot, is then set and the vehicle proceeds unless the end key has been pushed, as discussed above. If the end key is not pushed, the program loops via the connectors C. For the next point, means are provided for determining whether the totals of 64 maximum readings have been taken. If 64 readings have not been taken, at the next distance or DTC count, the WAS reading is stored in the counter as well as the RTC and LTC readings, but only if the difference between the current and previous WAS readings differ by more than 10%. This operation preserves points from the table if no steering corrections are required.

As another safeguard, a maximum time which is equivalent to a distance for the next reading is accumulated, as by counting a TMINT interrupt pulse from the timer circuits 130 (FIG. 3). If the time has expired, the readings DTC, RTC and LTC are nevertheless stored at the next point in the table. If the time has not expired, it is assumed that a reading has already been stored or the system is ready to go to the next point along the turn and the program loops back via the connectors C, unless the end key has been pushed. As each table location is filled with readings, the distance to the next reading, preferably equal distances being provided between readings, is set.

After 64 readings have been taken the display 104 indicates a memory overrun error. The keyboard 102 is scanned to see if the end key is pushed. After the end key is pushed, the memory, if desired may be cleared if a new programmed turn or other maneuver is to be learned. The system then returns to the main loop via the connectors A.

At any time the vehicle may be stopped and placed in the manual mode. This will nullify operations in the virtual guidance, calibrate, acquisition or wire guidance modes. The operator then must reacquire the wire under guidance (see FIG. 9(a)). The only exception is the learning mode which may be nullified by pressing the "end" key and then reentering the learning mode.

From the foregoing description it will be apparent that there has been provided an improved AGVS system. While a preferred embodiment of the system which may be used with vehicles having different sensor arrays has been described, variations and modifications therein as well as other AGVS systems within the scope of the invention and utilizing features thereof, will undoubtedly suggest themselves to those skilled in the art. Accordingly, the foregoing description should be taken as illustrative and not in a limiting sense.

We claim:

1. In an automated guided vehicle system (AGVS) wherein a vehicle is steered along a path defined by a signal-carrying wire and having a steering wheel for steering the vehicle, the improvement comprising a first and second set of sensor means on said vehicle and responsive to effects dependent upon the signal-carrying wire and dependent of the signal-carrying wire respectively, for detecting the direction in which said vehicle is being steered and providing separate output signals, each representing said direction, means for selecting said output signals from different ones of said first and second sets of sensor means to guide said vehicle principally in response to different ones of said output signals in different portions of said path, and means for controlling the steering of said vehicle in response to said output signals which have been selected to provide automated guidance thereof.

2. The improvement in said AGVS as set forth in claim 1 wherein a first of said first set of sensor means includes means on said vehicle inductively coupled to said wire for providing a first of said output signals which detects the direction in which said vehicle is being steered, and means responsive to said first of said output signals for preventing automated guidance of said vehicle unless said vehicle is located on the wire in a position where said first of said first set of sensor means is in close proximity to the wire.

3. The improvement in said AGVS as set forth in claim 2 further comprising means responsive to said first of said output signals for enabling said vehicle to be manually steered until it reaches a position where said first of said output signals is detected and where said first of said first set of sensor means is further away from the wire than said position of close proximity with the wire such that the vehicle has acquired the wire.

4. The improvement in said AGVS as set forth in claim 1 wherein said first set of sensor means comprises first and second sensor means on said vehicle, both for detecting the direction in which said vehicle is being steered, and second sensor means being outward of said first sensor means, and said first and second sensor means being inductively coupled to said wire for providing a first and a second of said output signals, and means responsive to said second of said output signals for enabling said vehicle to be manually steered until it reaches a position where said second of said output signals is of such amplitude to indicate that said vehicle has acquired the wire.

5. The improvement in said AGVS as set forth in claim 4 further comprising means responsive to said first output signal for preventing automated guidance of said vehicle unless said vehicle is located on the wire in a position with said first sensor means in close proximity with the wire.

6. The improvement in said AGVS as set forth in claim 1 wherein a first of said second set of sensor means comprises means for providing first output signals representing the angular position of said steering wheel, a first of said first set of sensor means comprises means on said vehicle inductively coupled to said wire for providing second output signals representing the deviation of said vehicle from said wire.

7. The improvement in said AGVS as set forth in claim 6 further comprising means for converting said first and second output signals into first and second digital signals, means for deriving a digital steering correction signal corresponding to the difference between said first and second digital signals for operating said steering controlling means to cause said vehicle to follow the wire.

8. The improvement is said AGVS as set forth in claim 6 wherein a second of said first set of sensor means comprises means disposed on said vehicle and inductively coupled to said wire for providing a third of said output signals representing the deviation of said vehicle from said wire, said first and second sensor means of said first set being located near opposite ends of said vehicle, and means for deriving a steering correction signal corresponding to the difference between said first output signal and the difference between said second and third output signals for operating said steering controlling means to cause said vehicle to follow the wire.

9. The improvement in said AGVS as set forth in claim 6 wherein said vehicle has at least three wheels two of which are journalled for rotation about an axis perpendicular to the center line of said vehicle and the third of said wheels is said steering wheel, said second set of sensor means comprising second and third sensor means for providing fourth and fifth output signals each representing the distance of rotation of different ones of said two wheels.

10. The improvement in said AGVS as set forth in claim 9 further comprising means responsive to the difference between said first output signals of said first of said second set sensor means and the difference between said fourth and fifth output signals of said second and third sensor means of said second set of sensor means for deriving a steering correction signal for operating said steering controlling means.

11. The improvement in said AGVS as set forth in claim 1 which further comprises a plurality of stations along said path each having said wire displaced transversely of said path in different directions to define a pattern representing by a plurality of bits of a digital code, said selecting means including means on said vehicle for reading said pattern and obtaining digital signals for selecting said different ones of said output signals and to select different modes of operation of said vehicle and which enables said vehicle to be guided between different locations along said path.

12. The improvement in said AGVS as set forth in claim 11 wherein said path has a main path defined by at least a first wire carrying a signal of frequency $f_1$ and a plurality of spurs defined by at least a second wire carrying a frequency $f_2$ different from $f_1$, said first set of sensor means including means on said vehicle inductively coupled to said first and second wires for providing said signal-carrying wire dependent output signals, and means operated by said digital signals for selectively enabling said signal-carrying wire dependent output signals to be provided in response to said first wire carried signal of frequency $f_1$ and second wire carried signal of frequency $f_2$.

13. The improvement in said AGVS as set forth in claim 1 wherein said first set of sensor means includes means on said vehicle inductivly coupled to said wire for providing at least one of said output signals, means for converting said one output signal into successive digital signals corresponding thereto, and means for deriving a correction signal for operating said steering means when the difference in magnitude between each of a plurality of said successive digital signals is within a certain magnitude limits whereby to discriminate against perturbations in said one output signal.

14. The improvement in said AGVS as set forth in claim 1 wherein said selecting means includes means for selecting first output signals from one of said sensor means in said first set to operate said steering controlling means while said vehicle is traveling along a straight portion of said path, and means responsive to the output signals from at least one other of said sensor means in said first set for generating signals for calibrating said steering controlling means.

15. The improvement in AGVS as set forth in claim 14 wherein said one of said sensor means in said first set is a first coil having its axis vertical and perpendicular to a line between the ends of said vehicle along the center thereof, said other sensor means in said first set being a pair of coaxial coils disposed on opposite sides of said center line with their axes horizontal, and means for deriving said first output signals from the difference in amplitudes of the signals induced into said pair of horizontal coils from said wire, while said signals for calibrating said controlling means are derived from said first coil.

16. The improvement in said AGVS as set forth in claim 15 wherein said second set of sensor means includes means responsive to the angular position of said steering wheel for providing another of said output signals, said calibrating means being responsive to said steering wheel sensor output signals and said first output signals from said horizontal coils.

17. The improvement in said AGVS as set forth in claim 9 further comprising means for providing a sequence of signals representing values corresponding to said first, fourth and fifth output signals at successive points along a portion of said path defining a maneuver to be carried out by said vehicle, and means responsive to said sequence of signals and said first, fourth and fifth signals at said points for providing said output signals for said steering controlling means.

18. The improvement in said AGVS as set forth in claim 9 further comprising means for maneuvering said vehicle under manual control along a portion of said path, means responsive to at least said first output signals for storing values corresponding to the values thereof at successive points along said portion of said path while maneuvered on the manual control therealong, and means responsive to said stored values and actual values of at least said first output signals when said vehicle travels along said path portion under control of said steering controlling means which provides automated guidance thereof for providing said output signals for said steering controlling means.

19. In an automated guided vehicle system (AGVS), having an electric signal carrying wire defining a path along which vehicles are automatically steered and sensor means for deriving, when inductively coupled to said wire, first control signals which vary in accordance with the deviations of said vehicle from said wire, the improvement comprising a plurality of stations along said path each having said wire displaced transversely of said path in opposite directions to define a pattern representing by plurality of bits of a digital code, further sensor means for producing second control signals dependent upon the direction of travel of said vehicle and independent of said wire, means operative upon detection of said pattern for guiding said vehicle with said second control signals while said vehicle travels over said pattern, and means for reading said pattern for deriving digital signals therefrom to select different modes of operation of said vehicle.

20. The improvement in said AGVS as set forth in claim 19 further comprising means for providing successive pulses corresponding to successive incremental distances said vehicle travels along said path, means responsive to said pulses for controlling said reading means to read said pattern.

21. The improvement in said AGVS as set forth in claim 20 wherein said reading means comprises first and second coils spaced in the direction of travel of said vehicle and with their axes vertical and perpendicular to the wire, said coils being interconnected in bucking relationship for providing code signals having oppositely polarized transitions in response to portions of the wire in said pattern which are displaced in opposite directions across said path.

22. The improvement in said AGVS as set forth in claim 21 wherein said reading means further comprises a shift register, and means responsive to said pulses and said code signals for entering successive bits of said digital signal into said register.

23. The improvement in said AGVS as set forth in claim 19 wherein the pattern contains at least two successive oppositely directed displacements of said wire which represent said digital signals as having initial digital bits of opposite value, and means for inhibiting response to said digital signal unless said initial bits are present.

24. The improvement in said AGVS as set forth in claim 22 wherein said pattern has initially two displacements in opposite directions representing initial bits of the digital signal of opposite value, and means responsive to the presence of a bit corresponding to the value of said initial bit in the last stage of said shift register after the occurrence of a number of said pulses corresponding to the distance of along said path occupied by said pattern for deriving an output representing that a digital signal is valid.

25. The improvement in said AGVS as set forth in claim 19 wherein said pattern has a plurality of cells defined each in a successive segment of said pattern between which said wire can be displaced in opposite directions (left or right) across said path, at least an initial one of said cells being defined by a displacement of said wire in one of said directions, and a successive plurality of said cells succeeding said initial cell defining groups of bits of said digital code in accordance with a code representing routing and control commands for said vehicles.

* * * * *